United States Patent
Lu et al.

(10) Patent No.: US 12,073,085 B2
(45) Date of Patent: Aug. 27, 2024

(54) FLASH MEMORY CONTROLLER AND METHOD CAPABLE OF USING ONE SET-FEATURE SIGNAL AS A MACRO EXECUTION SIGNAL TO EXECUTE MULTIPLE SET-FEATURE OPERATIONS FOR FLASH MEMORY DEVICE

(71) Applicant: Silicon Motion, Inc., Hsinchu County (TW)

(72) Inventors: Tsu-Han Lu, Hsinchu (TW); Hsiao-Chang Yen, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 45 days.

(21) Appl. No.: 17/852,385

(22) Filed: Jun. 29, 2022

(65) Prior Publication Data
US 2024/0004550 A1    Jan. 4, 2024

(51) Int. Cl.
*G06F 3/06*    (2006.01)

(52) U.S. Cl.
CPC .......... *G06F 3/0613* (2013.01); *G06F 3/0655* (2013.01); *G06F 3/0679* (2013.01)

(58) Field of Classification Search
CPC ..... G06F 3/0613; G06F 3/0655; G06F 3/0679
USPC .................................................. 711/154, 100
See application file for complete search history.

(56) References Cited

U.S. PATENT DOCUMENTS

| | | | | |
|---|---|---|---|---|
| 2013/0318285 A1* | 11/2013 | Pignatelli | ............ | G06F 12/0246 711/103 |
| 2014/0173173 A1* | 6/2014 | Battu | .................. | G11C 11/5621 711/173 |
| 2018/0158505 A1 | 6/2018 | Lee | | |
| 2019/0227749 A1* | 7/2019 | Wakchaure | ........... | G06F 3/0604 |
| 2020/0004453 A1* | 1/2020 | Rori | ....................... | G06F 3/0652 |
| 2020/0117625 A1 | 4/2020 | Browne | | |

FOREIGN PATENT DOCUMENTS

| | | |
|---|---|---|
| CN | 110851073 A | 2/2020 |
| TW | 200638258 | 11/2006 |
| TW | I313003 | 8/2009 |
| TW | I682403 B | 1/2020 |
| TW | 202132992 A | 9/2021 |
| TW | 202133181 A | 9/2021 |

OTHER PUBLICATIONS

Open NAND Flash Interface (ONFI) Specification, Revision 5.0, May 2021. (Year: 2021).*
Lu, the specification, including the claims, and drawings in the U.S. Appl. No. 17/852,403, filed Jun. 29, 2022.

* cited by examiner

*Primary Examiner* — David Yi
*Assistant Examiner* — Zubair Ahmed
(74) *Attorney, Agent, or Firm* — Winston Hsu

(57) ABSTRACT

A method of a flash memory controller to be used in a storage device and coupled to a flash memory device of the storage device through a specific communication interface includes: using a set-feature signal, which carries a set-feature command, a macro execution feature address, and corresponding macro execution parameter information, as a macro execution signal and transmitting the macro execution signal to the flash memory device to make the flash memory device execute multiple set-feature operations respectively having unique information defined by the corresponding macro execution parameter information carried in the macro execution signal.

26 Claims, 25 Drawing Sheets

| Index | Feature Address | P1 | P2 | P3 | P4 |
|---|---|---|---|---|---|
| 0 | | | | | |
| 1 | | | | | |
| : | | | | | |
| N | | | | | |

LUT1

| Macro number | Starting position | Ending position |
|---|---|---|
| 0 | | |
| 1 | | |
| : | | |
| N | | |

LUT2

Format of Macro start signal in second mode

Format of Macro end signal in second mode

Format of macro execution signal in second mode

Format of macro end signal in second mode

Format of macro execution signal in second mode

Format of macro start/end signal in second mode

P1: starting position
P2: whether to execute set-feature function simultaneously;
    '0': disable, '1': enable
P3: whether to clean macro record ;
    '0': keep record;
    '1': clear to default value
        (all 0 or all 1)
P4: '0': macro start
    '1': macro end Format of macro execution signal in second mode

FLASH MEMORY CONTROLLER AND METHOD CAPABLE OF USING ONE SET-FEATURE SIGNAL AS A MACRO EXECUTION SIGNAL TO EXECUTE MULTIPLE SET-FEATURE OPERATIONS FOR FLASH MEMORY DEVICE

BACKGROUND OF THE INVENTION

1. Field of the Invention

The invention relates to a flash memory scheme, and more particularly to a flash memory controller and a method.

2. Description of the Prior Art

Generally speaking, a conventional flash memory controller has to send a corresponding set-feature signal (e.g. a command sequence) to a conventional flash memory device each time when it is needed to control the conventional flash memory device execute a corresponding set-feature operation for a specific operation such as read or write operations. However, if it is needed to frequently control the conventional flash memory device to execute multiple set-feature operations, the performance will be degraded due to a large number of command sequences transmitted between the conventional flash memory controller and the conventional flash memory device.

SUMMARY OF THE INVENTION

Therefore one of the objectives of the invention is to provide a flash memory controller and a corresponding method, to solve the above-mentioned problems.

According to embodiments of the invention, a flash memory controller to be used in a storage device and coupled to a flash memory device of the storage device through a specific communication interface is disclosed. The flash memory controller comprises an input/output (I/O) circuit and a processor. The I/O circuit is coupled to the flash memory device through the specific communication interface, and is arranged for sending commands and data between the flash memory device and the processor. The processor is coupled to the I/O circuit, and is arranged for controlling the I/O circuit using a set-feature signal, which carries a set-feature command, a macro execution feature address, and corresponding macro execution parameter information, as a macro execution signal and transmitting the macro execution signal to the flash memory device to make the flash memory device execute multiple set-feature operations respectively having unique information defined by the corresponding macro execution parameter information carried in the macro execution signal.

According to the embodiments, a method of a flash memory controller to be used in a storage device and coupled to a flash memory device of the storage device through a specific communication interface is disclosed. The method comprises: providing an input/output (I/O) circuit to send commands and data between the flash memory device and a processor; and, providing the processor, and using the processor for controlling the I/O circuit using a set-feature signal, which carries a set-feature command, a macro execution feature address, and corresponding macro execution parameter information, as a macro execution signal and transmitting the macro execution signal to the flash memory device to make the flash memory device execute multiple set-feature operations respectively having unique information defined by the corresponding macro execution parameter information carried in the macro execution signal.

According to the embodiments, a flash memory controller to be used in a storage device and coupled to a flash memory device of the storage device through a specific communication interface is disclosed. The flash memory controller comprises an input/output (I/O) circuit and a processor. The I/O circuit is coupled to the flash memory device through the specific communication interface, and is arranged for sending commands and data between the flash memory device and the processor. The processor is coupled to the I/O circuit, and is capable of: operating in a first mode to control the I/O circuit using a first set-feature signal, which carries a set-feature command, a first feature address of a first set-feature operation, and first feature parameter information, to the flash memory device to make the flash memory device execute the first set-feature operation based on the first feature address and the first feature parameter information after the first set-feature signal is received by the flash memory device; and, operating in a second mode to control the I/O circuit using and transmitting a macro start signal or a prefix signal to transmit second set-feature signals, respectively comprising the set-feature commands, second feature addresses of second set-feature operations, and second feature parameter information, to the flash memory device to make the flash memory device record the second feature addresses and the second feature parameter information into at least one storage unit of the flash memory device; the second feature addresses are different from each other.

According to the embodiments, a method of a flash memory controller to be used in a storage device and coupled to a flash memory device of the storage device through a specific communication interface is disclosed. The method comprises: providing an input/output (I/O) circuit for sending commands and data between the flash memory device and a processor; and providing the processor for: operating in a first mode to control the I/O circuit using a first set-feature signal, which carries a set-feature command, a first feature address of a first set-feature operation, and first feature parameter information, to the flash memory device to make the flash memory device execute the first set-feature operation based on the first feature address and the first feature parameter information after the first set-feature signal is received by the flash memory device; and, operating in a second mode to control the I/O circuit using and transmitting a macro start signal or a prefix signal to transmit second set-feature signals, respectively comprising the set-feature commands, second feature addresses of second set-feature operations, and second feature parameter information, to the flash memory device to make the flash memory device record the second feature addresses and the second feature parameter information into at least one storage unit of the flash memory device; the second feature addresses are different from each other.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution and a macro group execution method of set-feature operations which is capable of speeding up the operation of executing the multiple operations to be executed by a flash memory device 110 as well as reducing or simplifying the total time length of the whole command sequence associated with the operations.

Figure 1:
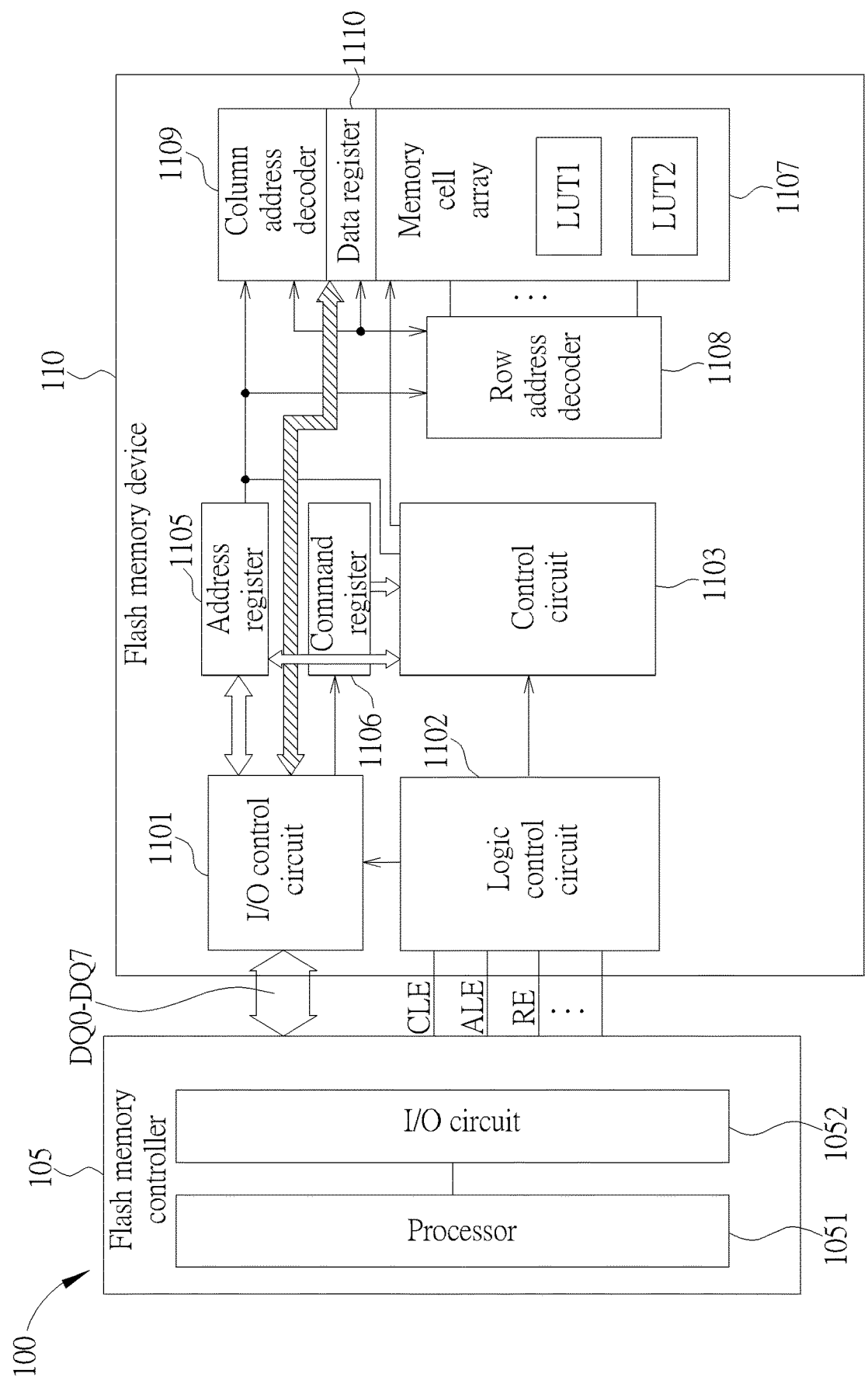
FIG. 1 is a block diagram of a storage device according to an embodiment of the invention.

FIG. 1 is a block diagram of a storage device 100 according to an embodiment of the invention. The storage device 100 for example is a flash memory storage device (but not limited) and comprises a memory controller such as a flash memory controller 105 and a memory device such as a flash memory device 110 having multiple flash memory chips/dies, each flash memory chip/die may comprise one or more different flash memory planes. The flash memory controller 105 at least comprises a processor 1051 and an input/output (I/O) circuit 1052. The processor 1051 is coupled to the I/O circuit 1052 and is arranged to control the I/O circuit 1052 sending access (e.g. read, write, erase, or the others) commands through a specific communication interface to the flash memory device 110 to control and access the flash memory device 110.

The flash memory device 110 comprises an I/O control circuit 1101, a logic control circuit 1102, a control circuit 1103, an address register 1105, a command register 1106, a memory cell array 1107, a row address decoder 1108, a column address decoder 1109, and a data register 1110. The memory cell array 1107 for example comprises a plurality of storage units such as blocks, pages, or sectors, and in this embodiment it allocates two storage spaces to implement two look-up tables to store corresponding information data of the set-feature operation(s). The two different look-up tables for example comprise a first look-up table LUT1 for storing the information of set-feature operation(s) sent from the flash memory controller 105 and a second look-up table LUT2 for storing macro group information defined by and sent from the flash memory controller 105; the first and second tables will be explained later.

The flash memory controller 105 is coupled to the flash memory device 110 through the specific communication interface and controls or accesses the flash memory device 110 by sending one or more commands into the flash memory device 110. The specific communication interface for example comprises at least signal ports/pins such as data pins DQ0-DQ7 or other data pins (not shown in FIG. 1), and logic control pins such as CLE (Command Latch Enable), ALE (Address Latch Enable), RE (Read Enable), and other logical control pins. The data pins are coupled to the I/O control circuit 1101, and the logic control pins are coupled to the logic control circuit 1102. For example, for a data read operation, the processor 1051 of the flash memory controller 105 sends a read command to the flash memory device 110 to control the memory cell array 1107 outputting data such as a block data or a page data from the pages in the memory cell array 1107 into to the data register 1110, and the flash memory device 110 then controls the data register 1110 outputting the data to the I/O control circuit 1101, so that the I/O control circuit 1101 can transmit the data to the flash memory controller 105 through the pins DQ0-DQ7 of the specific communication interface.

For a data write operation, to write a data unit into the memory cell array 1107, the flash memory controller 105 sequentially sends a write command, address information, and the data unit to the flash memory device 110 through the specific communication interface, and it uses the different level switching of pins ALE, CLE, and RE to control the control circuit 1103 controlling the I/O control circuit 1101 respectively transmitting the write command into the command register 1106 and the address information into the address register 1105. Then, when the control circuit 1103 executes the operation of the write command, the column address decoder 1109 and row address decoder 1108 are arranged to find appropriate storage unit(s) such as page(s) based on the address information stored in the address register 1105, and then the I/O control circuit 1101 can transmit the data unit to the memory cell array 1110 so that the data unit is correctly written into and stored by the storage unit(s).

Similarly, for a set-feature operation, the flash memory controller 105 may send a set-feature signal which comprises a set-feature command, a feature address, and feature parameter information/data to the flash memory device 110 through the specific communication interface. The feature address and feature parameter information can be stored by one or more storage units in the memory cell array 1110 and/or can be stored by a specific register outside the memory cell array 1110. A set-feature operation indicates that the flash memory controller 105 configures feature information (or parameter(s)) of a specific operation such as a read, write, erase, or other different operations before/when the flash memory controller 105 controls the flash memory device 110 execute the specific operation. For example, the flash memory controller 105 may use and transmit the set-feature signal to enable or disable some function(s) of the specific operation to be executed by the flash memory device 110. For example, the set-feature operation may be executed by the control circuit 1103 (or the flash memory device 110) after the flash memory device 110 is powered up or when a working temperate is changed. In addition, a set-feature signal/operation is associated with a unique feature address.

The flash memory device 110 provides and supports two different modes for the execution of set-feature operations, e.g. a first mode (e.g. a set-feature and execution mode of a single one set-feature operation) and a second mode (e.g. a set-feature and execution mode for a macro group of set-feature operations) for feature settings.

Figure 2:
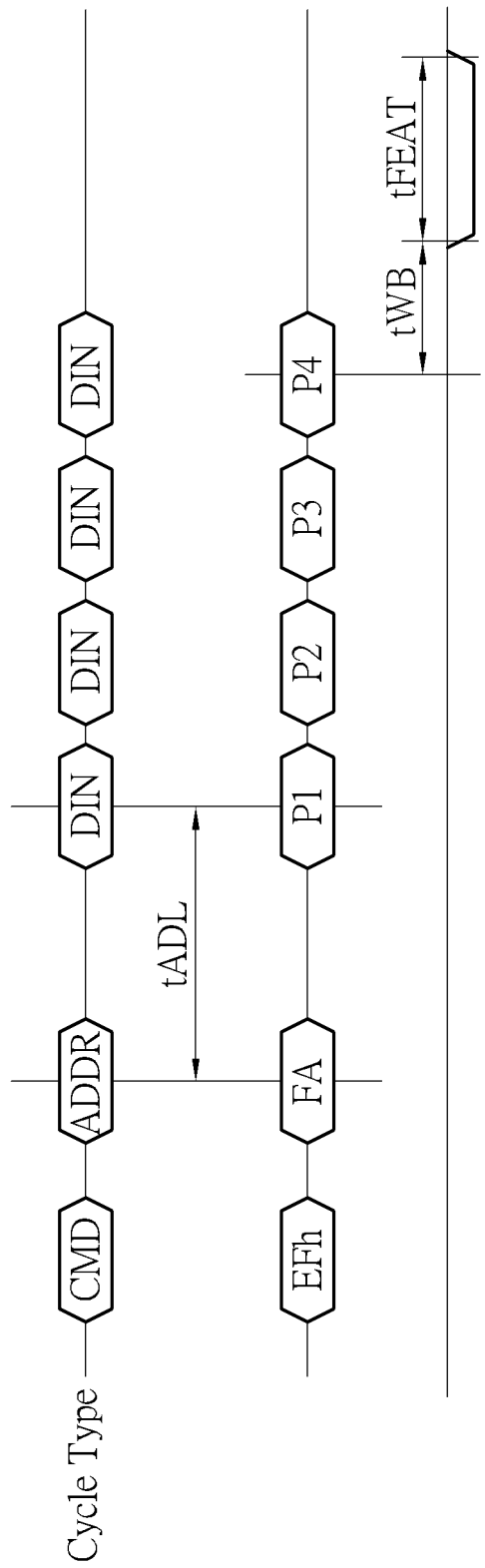
FIG. 2 is a diagram showing an example of a signal format of a set-feature signal according to an embodiment of the invention.
Figure 3:
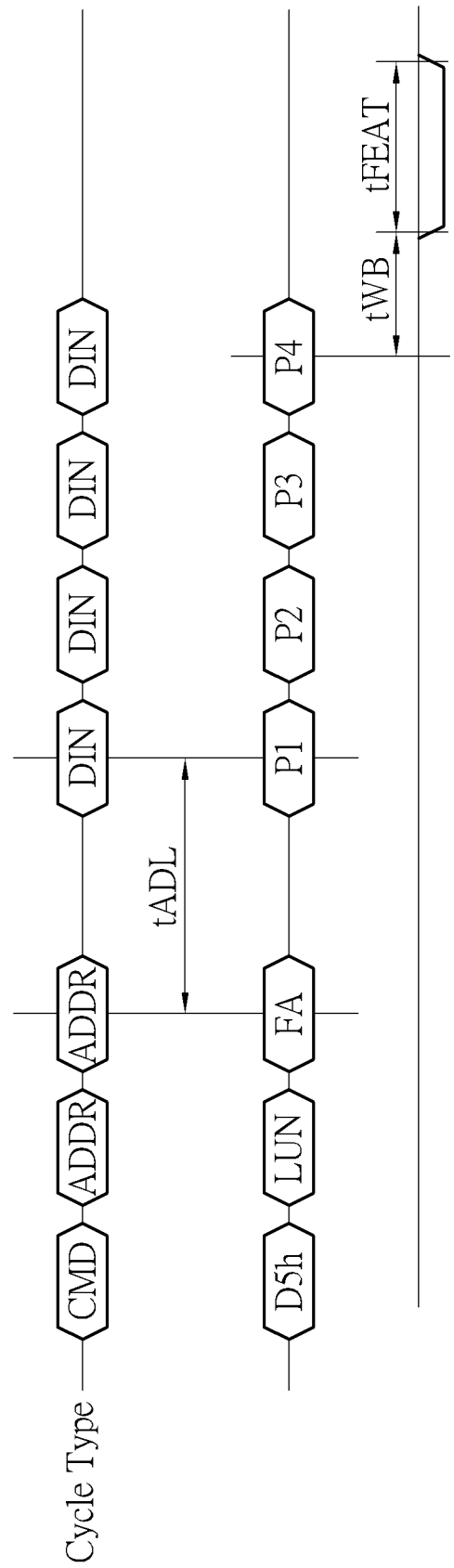
FIG. 3 is a diagram showing an example of a signal format of a set-feature signal according to another embodiment of the invention.

In the first mode, the flash memory controller 105 each time uses/transmits a set-feature signal from the flash memory controller 105 to the flash memory device 110 so as to control the flash memory device 110 configuring the feature information of one operation and instantly executing the set-feature operation. FIG. 2 and FIG. 3 are diagrams showing the examples of two different signal formats of a set-feature signal according to an embodiment of the invention. In FIG. 2, a set-feature signal, sent by the flash memory controller 105, may sequentially comprises a set-feature command such as EFh (i.e. 0xEF; 'h' means hexadecimal), a feature address FA, and feature information data or parameters P1-P4 each being formed by one byte (i.e. eight bits, but not limited). tADL indicates a waiting time before the feature parameter information P1-P4 is inputted to the flash memory device 110. tWB indicates a busy time during which no new commands are issued by the flash memory controller 105, and after the busy time tWB the flash memory device 110 is during another busy time tFEAT which means a busy time of the execution of set-feature operations of the flash memory device 110. That is, the flash memory device 110 instantly executes the set-feature operation defined by the feature address FA after receiving the set-feature signal.

Alternatively, in FIG. 3, a set-feature signal, sent by the flash memory controller 105, may sequentially comprises a different set-feature command such as D5h, a logical unit number (LUN) address, a feature address FA, and feature information data or parameters P1-P4 each being formed by one byte (i.e. eight bits, but not limited). The different set-feature command D5h is used to indicate the following address information comprises the LUN address and a feature address while the set-feature command EFh in FIG. 2 is used to indicate the following address information comprises merely a feature address. The flash memory device 110 also instantly executes the set-feature operation defined by the feature address FA and the LUN address after receiving the set-feature signal. For example, the flash memory device 110 may execute the set-feature operation for the storage units corresponding to the same LUN address respectively in different chip dies/planes. In addition, it should be noted that in the first mode the flash memory controller 105 needs to sequentially send N set-feature signals from the flash memory controller 105 to the flash memory device 110 to sequentially configure the different feature information of N different operations to be executed each time before the N different operations are executed.

Further, in the second mode, the flash memory controller 105 (or the processor 1051 controls the I/O circuit 1052) is arranged to control the flash memory device 110 (or control circuit 1103) sequentially store or record the feature information of multiple groups of operations by using macro start/end signal(s), and can use merely a macro execution signal/command to control the flash memory device 110 executing multiple set-feature operations. By using the second mode, the total time length of the whole command sequence associated with the operation of executing the operation of setting or modifying the different feature information can be significantly reduced. The macro start signal/command, sent by the flash memory controller 105, is used to indicate a start/beginning and corresponding parameter information of one or more set-feature signals to be sent by the flash memory controller 105, a macro end signal/command is used to indicate an end/tail and corresponding parameter information of the one or more set-feature signals which have been sent by the flash memory controller 105, and a macro execution signal/command is used to indicate instantly executing one or more set-feature operations defined in such macro execution signal. Multiple or macro feature operations can be configured in advanced stored in a flash memory device 110 by using the macro start signal and the macro end signal. One or more executions (or settings) of one or more feature operations can be achieved by using merely one macro execution signal. The length of the whole command sequence can be simplified.

In addition, in the following paragraphs, the macro start parameter information/data carried in a macro start signal, the macro execution parameter information/data carried in a macro execution signal, and the macro end parameter information carried in a macro end signal may be called as parameter information/data so as to simplify the descriptions.

In addition, in different embodiments of the second mode, the flash memory controller 105 may use different signal formats to send set-feature signals to the flash memory device 110 and is arranged to negotiate with the flash memory device 110 of using which kind signal format before sending the set-feature signals. The different embodiments are described in the following.

Figure 4:
FIG. 4 is a diagram showing an example of using a set-feature signal carrying a macro start at the feature address as a macro start command sequence (or signal) according to an embodiment of the invention.

FIG. 4 is a diagram showing an example of using a set-feature signal carrying a macro start at the feature address as a macro start command sequence (or signal) according to an embodiment of the invention. In FIG. 4, the format of the macro start signal is similar to that of a set-feature signal, and it sequentially comprises the set-feature command D5h (i.e. 0xD5), a logical unit number address such as LUN_n, the macro start feature address such as AAh (i.e. 0xAA, but not limited), and feature information data or parameters P1-P4 each being formed by one byte (i.e. eight bits, but not limited). The flash memory controller 105 can send the macro start signal in FIG. 4 to the flash memory device 110 so as to indicate that the set-feature signal(s) received in the following is/are associated with the macro number of a same group of set-feature operations, the LUN address LUN_n, and the corresponding parameter data of the macro/common feature settings of the same group of set-feature operations.

For example, the parameter data P1 of the macro start signal in FIG. 4 is used to indicate a macro index/number/value such as a group number (or ID) of a specific group of set-feature operations, the parameter data P2 of the macro start signal is used to indicate the starting position/tag of index values of the specific group of set-feature operations, and the parameter data P3 of the macro start signal for example comprises two bits in which a first bit bit0 is used to indicate whether to execute the set-feature operations/functions simultaneously/instantly while a second bit bit1 is used to indicate whether to clear/clean a corresponding macro record; the parameter data P4 may be reserved. For instance, the operation of executing the set-feature operations simultaneously/instantly is disabled when the first bit bit0 is set as a first logic bit '0', and it is enabled when the first bit bit0 is set as '1'. The macro record is kept when the second bit bit1 is set as '0', and the macro record is clear to the default value such as all '1' or all '0' when the second bit bit1 is set as a second logic bit '1'. Thus, when receiving the macro start signal in FIG. 4, the flash memory device 110 can know that a same group of set-feature operations/signals can be receive in the following and also knows the common settings for the same group of set-feature operations.

Figure 5:
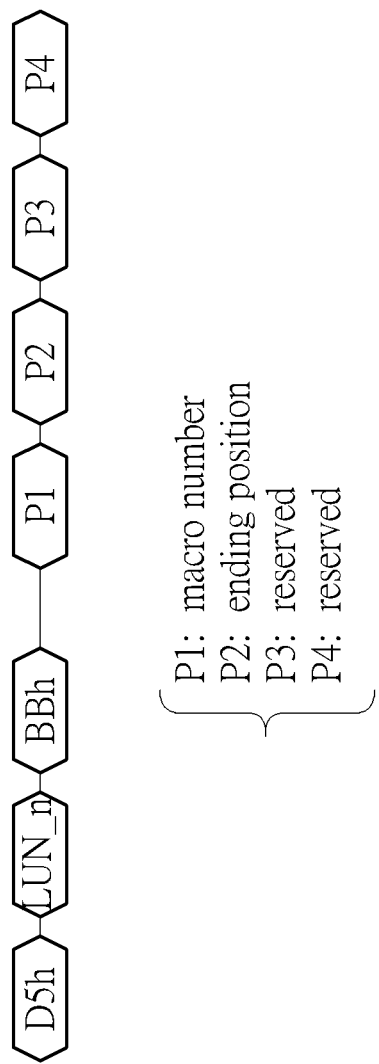
FIG. 5 is a diagram showing an example of using a set-feature signal carrying a macro end at the feature address as a macro end signal according to an embodiment of the invention.

FIG. 5 is a diagram showing an example of using a set-feature signal carrying a macro end at the feature address as a macro end signal according to an embodiment of the invention. In FIG. 5, the macro end signal sequentially comprises the set-feature command D5h (i.e. 0xD5), a logical unit number address such as LUN_n, the macro end such as BBh (i.e. 0xBB, but not limited) at the feature address, and feature information data or parameters P1-P4 each being formed by one byte (i.e. eight bits, but not limited). The flash memory controller 105 can send the macro end signal in FIG. 5 to the flash memory device 110 so as to indicate that the set-feature signal corresponding to the macro end address BBh is used as a macro end signal, the LUN address LUN_n, and the corresponding parameter data of the macro/common settings of the same group of set-feature operations. For example, the parameter data P1 of the macro end signal is used to indicate the macro number such as a group number (or ID) of a specific group of set-feature operations, the parameter data P2 of the macro end signal is used to indicate the ending position/tag of index values of the specific group of set-feature operations, and the parameter data P3 and P4 may be reserved. Thus, when receiving the macro end signal in FIG. 5, the flash memory device 110 can know that receiving a group of set-feature operations/signals has been ended.

Figure 6:
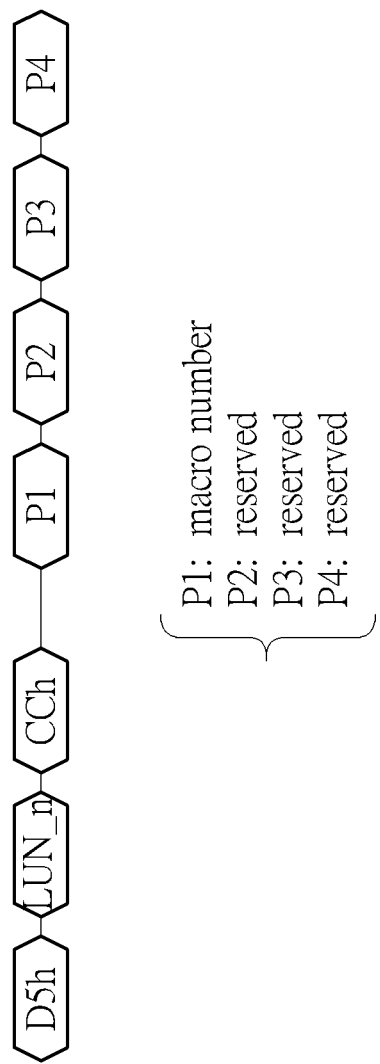
FIG. 6 is a diagram showing an example of using a set-feature signal carrying a macro execution at the feature address as a macro execution signal according to an embodiment of the invention.

FIG. 6 is a diagram showing an example of using a set-feature signal carrying a macro execution at the feature address as a macro execution signal according to an embodiment of the invention. In FIG. 6, the macro execution signal sequentially comprises the set-feature command D5h (i.e. 0xD5), a logical unit number address such as LUN_n, the macro execution such as CCh (i.e. 0xCC, but not limited) at the feature address, and feature information data or parameters P1-P4 each being formed by one byte (i.e. eight bits, but not limited). The flash memory controller 105 can send the macro execution signal in FIG. 6 to the flash memory device 110 so as to indicate that the set-feature signal is associated with an execution of the macro feature setting of the same group of set-feature operations, the LUN address LUN_n, and the corresponding parameter settings of the macro feature setting of the same group of set-feature operations. For example, the parameter data P1 of the macro execution signal is used to indicate a macro number such as a group number (or ID) of a specific group of set-feature operations, and the parameter data P2, P3, and P4 may be reserved. Thus, when receiving the macro execution signal in FIG. 6, the flash memory device 110 can be arranged to execute the group of set-feature operations corresponding to the macro number indicated in the macro execution signal in FIG. 6.

Figure 7:
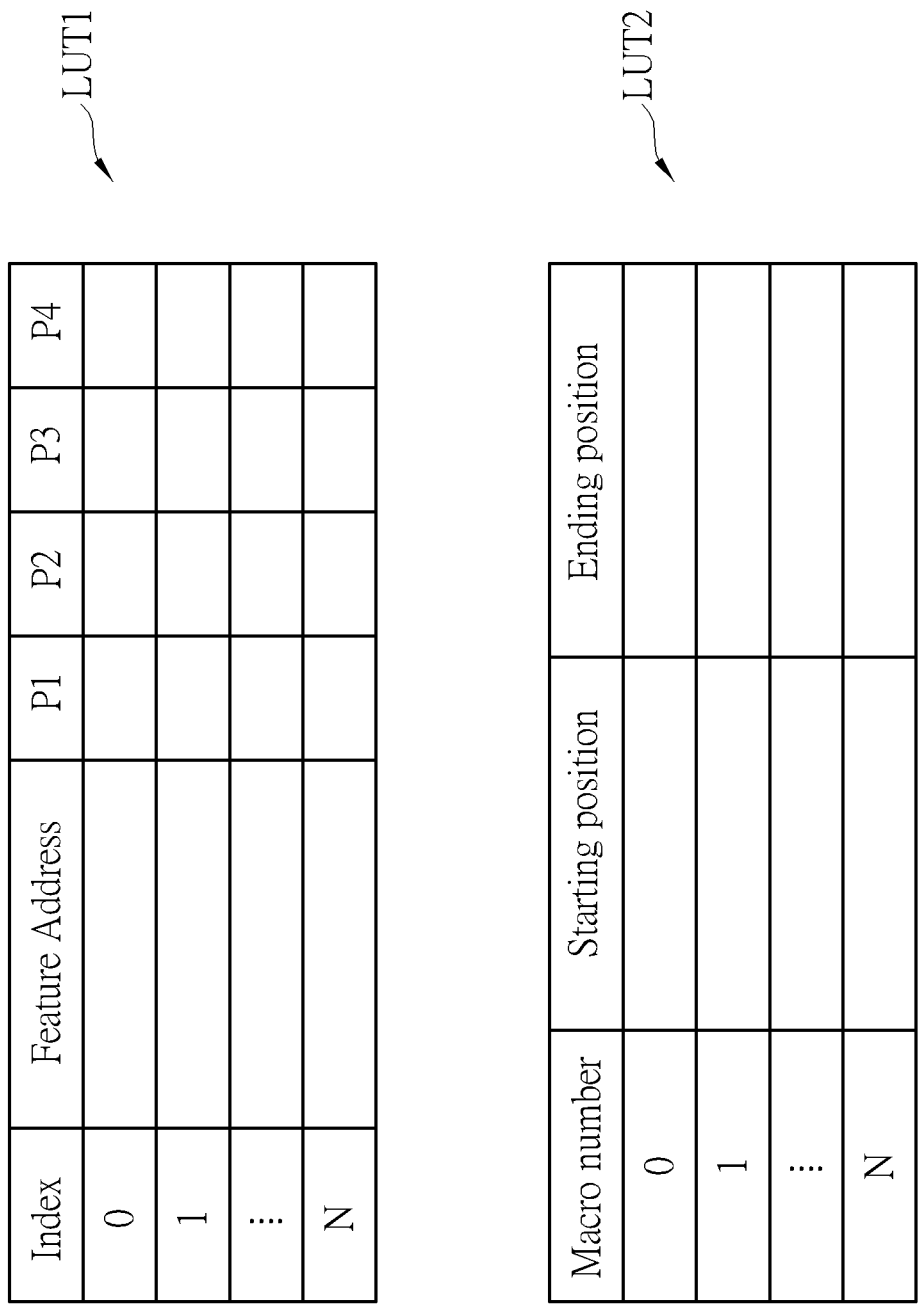
FIG. 7 is a diagram showing the formats of the tables LUT1 and LUT2 stored in the flash memory device 110 according to an embodiment of the invention.

The above set-feature information mentioned in FIG. 4, FIG. 5, and FIG. 6 is stored or recorded in the flash memory device 110. FIG. 7 is a diagram showing the formats of the tables LUT1 and LUT2 stored in the flash memory device 110 according to an embodiment of the invention. In FIG. 7, in the top table LUT1, each row records for example six fields such as an index value, a feature address, and feature parameter data P1-P4 for one corresponding set-feature operation wherein the index value field records an offset number for the set-feature operation, the feature address field records the feature address information of such set-feature operation, the parameter fields P1-P4 records the corresponding information of parameter data P1-P4 of the set-feature operation. For instance, the total number of total different set-feature operations is equal to (N+1) which indicates that the top table LUT1 can record information of (N+1) rows.

In addition, in the bottom table LUT2, each row records a macro number field, a starting position field, and an ending position field. The macro number field records information carried by the parameter data P1 in FIG. 4, the starting position field records the information carried by the parameter data P2 in FIG. 4, and the ending position field records the information carried by an ending position information of a group of different set-feature operations. For instance, the total number of total groups of different set-feature operations is equal to (M+1) which indicates that the bottom table LUT2 can record information of (M+1) rows.

Figure 8:
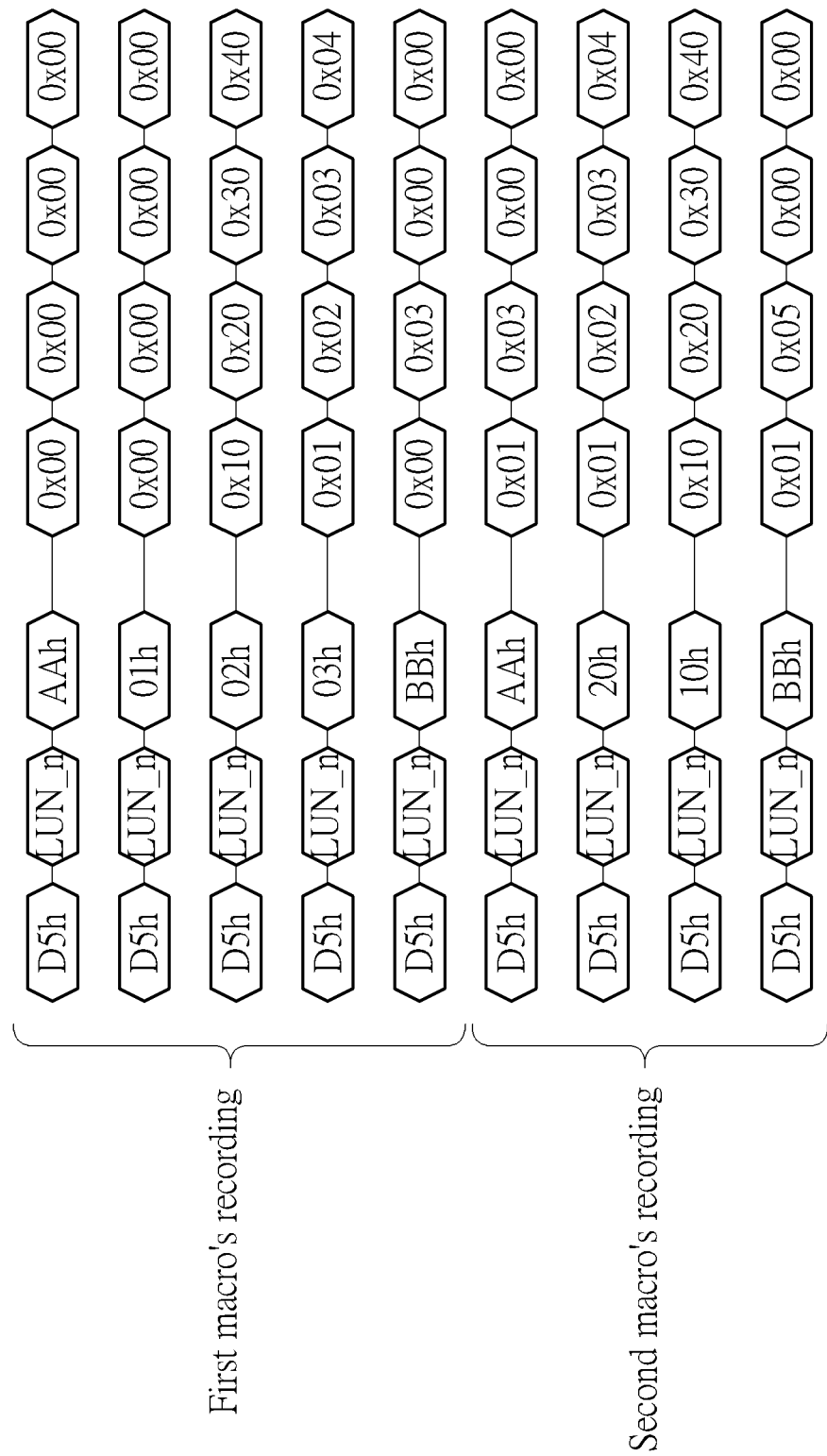
FIG. 8 is a diagram of an example of the flash memory controller sequentially transmitting a sequence of command sequences to set two groups of set-feature operations according to an embodiment of the invention.

FIG. 8 is a diagram of an example of the flash memory controller 105 sequentially transmitting a sequence of command sequences to set two groups of set-feature operations according to an embodiment of the invention. In FIG. 8, the total number of command sequence for example is equal to nine. For transmitting a first macro group of set-feature signals, for example (but not limited), the flash memory controller 105 sequentially sends five command sequences, e.g. a macro start signal, three different set-feature signals, and a macro end signal. A first command sequence, i.e. a first macro start signal, sequentially comprises the set-feature command D5h, a logical unit number address LUN_n, the macro start feature address AAh, and feature information data or parameters P1-P4 wherein the feature data P1-P4 respectively carry information of 0x00 so as to indicate that the macro number is equal to 0, the starting position/offset is equal to 0, the simultaneous execution operation is disabled, and keeping the record (i.e. not clean the record).

A second command sequence in FIG. 8, i.e. a set-feature signal, sequentially comprises the set-feature command D5h, the logical unit number address LUN_n, a feature address 01h, and feature information data P1-P4 wherein in the example the feature data P1-P4 respectively carry information of 0x00 (but not limited). A third command sequence in FIG. 8, i.e. a set-feature signal, sequentially comprises the set-feature command D5h, the logical unit number address LUN_n, a feature address 02h, and feature information data P1-P4 wherein in the example the feature data P1-P4 respectively carry information of 0x10, 0x20, 0x30, and 0x40 (but not limited). A fourth command sequence in FIG. 8, i.e. a set-feature signal, sequentially comprises the set-feature command D5h, the logical unit number address LUN_n, a feature address 03h, and feature information data P1-P4 wherein in the example the feature data P1-P4 respectively carry information of 0x01, 0x02, 0x03, and 0x04 (but not limited).

A fifth command sequence in FIG. 8, i.e. a first macro end signal, sequentially comprises the set-feature command D5h, the logical unit number address LUN_n, the macro end feature address BBh, and feature information data P1-P4 wherein in the example the feature data P1-P4 respectively carry information of 0x00, 0x03, 0x00, and 0x00 so as to indicate that this is an ending tag for the first macro or group having the macro number 0 and its ending position is for example equal to 3 (but not limited). Since in this example the number of set-feature signals between the macro start signal and macro end signal is equal to three and the macro is the first macro or group, the ending position is equal to three.

Similarly, in FIG. 8, for transmitting a second macro group of set-feature signals, for example (but not limited), the flash memory controller 105 sequentially sends four command sequences, e.g. a second macro start signal, two set-feature signals, and a second macro end signal. In FIG. 8, a sixth command sequence, i.e. the second macro start signal, sequentially comprises the set-feature command D5h, a logical unit number address LUN_n, the macro start feature address AAh, and feature information data or parameters P1-P4 wherein the feature data P1-P4 respectively carry information of 0x01, 0x03, 0x00, and 0x00 so as to indicate that the macro number is equal to 1, the starting position is equal to 3, the simultaneous execution operation is disabled, and keeping the record (i.e. not clean the record).

A seventh command sequence in FIG. 8, e.g. a set-feature signal, sequentially comprises the set-feature command D5h, the logical unit number address LUN_n, a feature address 20h, and feature information data P1-P4 wherein in the example the feature data P1-P4 respectively carry information of 0x01, 0x02, 0x03, and 0x04 (but not limited). An eighth command sequence in FIG. 8, e.g. a set-feature signal, sequentially comprises the set-feature command D5h, the logical unit number address LUN_n, a feature address 10h, and feature information data P1-P4 wherein in the example the feature data P1-P4 respectively carry information of 0x10, 0x20, 0x30, and 0x40 (but not limited).

A ninth command sequence in FIG. 8, i.e. the second macro end signal, sequentially comprises the set-feature command D5h, the logical unit number address LUN_n, the macro end feature address BBh, and feature information data P1-P4 wherein in the example the feature data P1-P4 respectively carry information of 0x01, 0x05, 0x00, and 0x00 so as to indicate that this is an ending tag for the second macro or group having the macro number 1 and its ending position is for example equal to 5 (but not limited). Since in this example the number of set-feature signals in the first macro and second macro is equal to five, the ending position is equal to five. The above-mentioned examples are not limitations of the invention.

By doing so, the flash memory device 110 can know that a macro start signal is received if such signal carries the set-feature command and a macro start feature address, and similarly also knows that a macro end signal is received if such signal carries the set-feature command and a macro end feature address.

The flash memory device 110 uses the first table LUT1 and the second table LUT2 to respectively store the index values/numbers, feature addresses, and parameter data of all set-feature signals, and store the macro number(s), starting position(s), and ending position(s) of macro(s). The following tables are associated with the example of command sequences shown in FIG. 8.

Example of Table LUT1:

| Index value | Feature address | P1 | P2 | P3 | P4 |
|---|---|---|---|---|---|
| 0 | 0x01 | 0x00 | 0x00 | 0x00 | 0x00 |
| 1 | 0x02 | 0x10 | 0x20 | 0x30 | 0x40 |
| 2 | 0x03 | 0x01 | 0x02 | 0x03 | 0x04 |
| 3 | 0x20 | 0x01 | 0x02 | 0x03 | 0x04 |
| 4 | 0x10 | 0x10 | 0x20 | 0x30 | 0x40 |

As shown in the example of first table LUT1, the flash memory device 110 is arranged to sequentially store and record the information of feature addresses and corresponding parameters/values carried in the sequentially received set-feature signals in the second mode at the different fields of different rows in the table LUT1.

Example of Table LUT2:

| Macro number | Starting position | Ending position |
|---|---|---|
| 0 | 0 | 3 |
| 1 | 3 | 5 |

As shown in the example of second table LUT2, the flash memory device 110 is arranged to sequentially store and record the information of macro numbers, starting positions, and ending positions of different macros or groups of set-feature signals at the different fields of different rows in the table LUT2.

Figure 9:
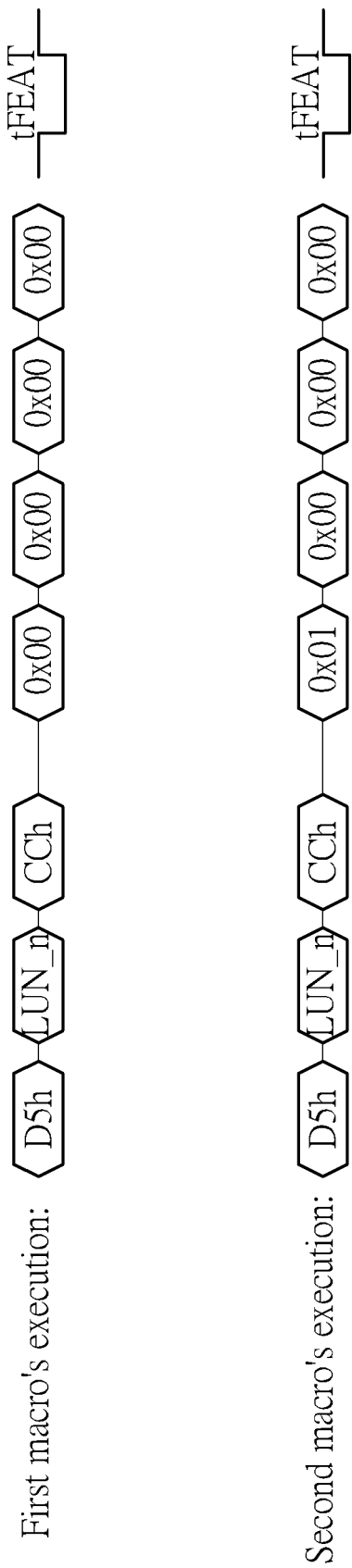
FIG. 9 is a diagram of examples of the flash memory controller sending two command sequences to respectively trigger the flash memory device executing the corresponding set-feature operations in FIG. 8 according to an embodiment of the invention.

FIG. 9 is a diagram of examples of the flash memory controller 105 sending two command sequences to respectively trigger the flash memory device 110 executing the corresponding set-feature operations in FIG. 8 according to an embodiment of the invention. In FIG. 9, the flash memory controller 105 uses a set-feature signal carrying a macro execution at the feature address as a macro execution command sequence (or signal). For example, a first command sequence in FIG. 9, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x00 to indicate executing a macro group having the macro number 0 while the other feature data P2-P4 are reserved which may be indicated by the default value 0x00. Thus, when receiving such command sequence, the flash memory device 110 can be arranged to execute the set-feature operations corresponding to the macro number 0. In this example, the flash memory device 110 based on the second table LUT2 can know that the index values/numbers of the set-feature operations are from 0 to 2 since the ending position indicates 3 which is a next index value offset, and thus the flash memory device 110 based on the first table LUT1 can be arranged to execute corresponding set-feature operations for the feature addresses 0x01, 0x02, and 0x03; tFEAT in FIG. 9 means a busy time of the execution of set-feature operations of the flash memory device 110.

Similarly, a second command sequence in FIG. 9, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x01 to indicate executing a macro group having the macro number 1 while the other feature data P2-P4 are reserved which may be indicated by the default value 0x00. Thus, when receiving such command sequence, the flash memory device 110 can be arranged to execute the set-feature operations corresponding to the macro number 1. In this example, the flash memory device 110 based on the second table LUT2 can know that the index values/numbers of the set-feature operations are from 3 to 4 since the ending position indicates 5 which is a next index value offset, and thus the flash memory device 110 based on the first table LUT1 can be arranged to execute corresponding set-feature operations for the feature addresses 0x20 and 0x10; tFEAT in FIG. 9 means a busy time of the execution of set-feature operations of the flash memory device 110.

Figure 10:
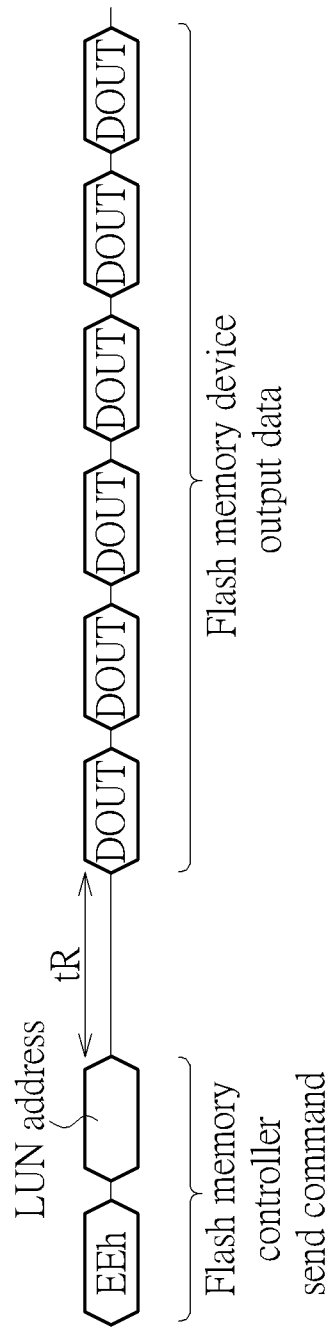
FIG. 10 is a diagram of an example of the flash memory controller in the second mode performing a get-feature operation defined in the first mode according to an embodiment of the invention.

FIG. 10 is a diagram of an example of the flash memory controller 105 in the second mode performing a get-feature operation defined in the first mode according to an embodiment of the invention. In FIG. 10, the flash memory controller 105 may send a command sequence sequentially comprising a get-feature command such as EEh (but not limited) and an LUN address LUN_n to the flash memory device 110. Then, when receiving such command sequence, the flash memory device 110 may perform a read page operation to read out the information of the first table LUT1 and second table LUT2 from one or more page units in the memory cell array 1107. After a read page operation time tR has been finished, the flash memory device 110 can output and transmit the information data, i.e. a sequence of data DOUT, to the flash memory controller 105. For example, the sequence of data DOUT sequentially comprises information data of the second table LUT2 and information of the first table LUT1. For instance, in a first step, the flash memory device 110 is arranged to output the starting positions and the ending positions respectively corresponding to the different macro numbers. Then, in a second step, the flash memory device 110 is arranged to output the feature addresses and corresponding parameter data respectively associated with the different set-feature operations/signals. Thus, after retrieving the information data from the flash memory device 110 by using the command EEh and LUN address LUN_n, the flash memory controller 105 can check whether the configured settings of the set-feature operations in the flash memory device 110 are correct or not.

In the above embodiments, the get-feature command in the second mode is EEh and it may be configure to be different from a standard command (or a vendor specific command) and may be implemented by using a reserved command such as 0Bh, 12h, 14h, 82h-83h, 86h, and 8Eh wherein 'h' means hexadecimal. The following table shows the different examples of the reserved commands which can be used to implement the second mode's get-feature command:

| Type | Opcode |
|---|---|
| Standard Command Set | 00h, 05h-06h, 10h-11h, 15h, 18h, 30h-32h, 35h, 3Fh, 60h, 62h-64h, 70h, 76h, 78h, 80h-81h, 85h, 90h, 1Bh-1Ch, D0h-D1h, D4h-D5h, D9h, E0h-E2h, ECh-EFh, F1h-F2h, F9h, FAh, FCh, FFh |
| Vendor Specific | 01h-04h, 07h-0Ah, 0Ch-0Fh, 13h, 16h-17h, 19h-1Ah, 1Dh-2Fh, 33h-34h, 36h-3Eh, 40h-5Fh, 61h, 65h-6Fh, 71h-75h, 77h, 79h-7Fh, 84h, 87h-8Dh, 8Fh, 91h-CFh, D2h-D3h, D6h-D8h, DAh-DFh, E3h-EBh, F0h, F3h-F8h, FBh, FD-FEh |
| Reserved | 0Bh, 12h, 14h, 82h-83h, 86h, 8Eh |

It should be noted that an example of the get-feature command can be equal to an example of a vendor specific command which may be defined by a vendor; this is not intended to be a limitation of the invention.

Further, at least one of the above-mentioned macro start feature address AAh, macro end feature address BBh, and macro execution feature address CCh may be configured to a different feature address such as a reserved feature address (e.g. 03h-0Fh) or a vendor specific address (e.g. 59h-5Fh) shown in the following table:

| Feature | Description |
| --- | --- |
| 00h | Reserved |
| 01h | Timing Mode |
| 02h | NV-DDR2/NV-DDR3/NV-LPDDR4 Configuration |
| 03h-0Fh | Reserved |
| 10h | I/O Drive Strength |
| 11h-1Fh | Reserved |
| 20h | DCC, Read, Write Tx Training |
| 21h | Write Training RX |
| 22h | Channel ODT configuration for NV-LPDDR4 |
| 23h | Internal VrefQ value |
| 24h-2Fh | Reserved |
| 30h | External Vpp Configuration |
| 31h-4Fh | Reserved |
| 50h | Reserved |
| 51h-57h | Reserved |
| 58h | Volume Configuration |
| 59h-5Fh | Reserved |
| 60h | Reserved |
| 61h | Reserved |
| 62h-7Fh | Vendor specific |
| 80h-FFh | Vendor specific |

Additionally, the operation of using the formats of macro start signal, macro end signal, and macro execution signals can be applied into the format of a set-feature signal defined in the first mode in FIG. 2 For example, a macro start signal in this situation may sequentially comprise the set-feature command EFh, the macro start feature address, and feature information data. A macro end signal in this situation may sequentially comprise the set-feature command EFh, the macro end feature address, and feature information data. A macro execution signal in this situation may sequentially comprise the set-feature command EFh, the macro execution feature address, and feature information data. This modification also falls within the scope of the invention.

Figure 11:
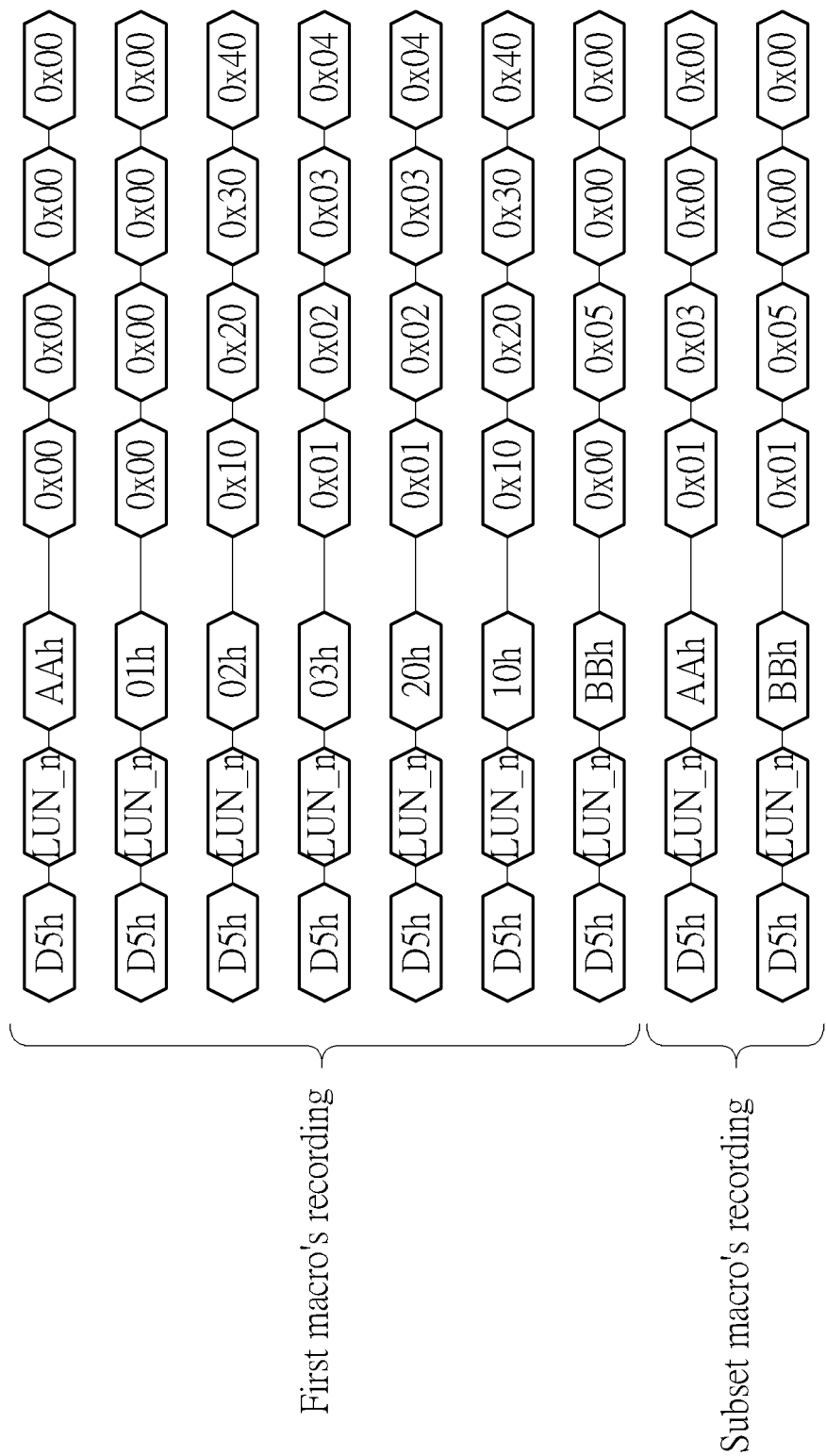
FIG. 11 is a diagram of an example of the flash memory controller sequentially transmitting a sequence of command sequences to set two groups of set-feature operations according to another embodiment of the invention.

Further, in one embodiment, when a specific macro group comprising the set-feature operations/signals which are identical to a subset of set-feature operations/signals comprised in another macro group which is previous configured and stored in the flash memory device 110, the flash memory controller 105 can send merely a macro start command sequence and a macro end command sequence which following the macro start command sequence to define and configure the subset of set-feature operations. FIG. 11 is a diagram of an example of the flash memory controller 105 sequentially transmitting a sequence of command sequences to set two groups of set-feature operations according to another embodiment of the invention. In FIG. 11, the total number of command sequence for example is equal to nine. For transmitting a first macro or group of set-feature signals, for example (but not limited), the flash memory controller 105 sequentially sends seven command sequences, e.g. a macro start signal, five different set-feature signals, and a macro end signal.

A first command sequence in FIG. 11, i.e. a first macro start signal, sequentially comprises the set-feature command D5h, a logical unit number address LUN_n, the macro start feature address AAh, and feature information data or parameters P1-P4 wherein the feature data P1-P4 respectively carry information of 0x00 so as to indicate that the macro number is equal to 0, the starting position/offset is equal to 0, the simultaneous execution operation is disabled, and keeping the record (i.e. not clean the record). A second command sequence in FIG. 11, i.e. a set-feature signal, sequentially comprises the set-feature command D5h, the logical unit number address LUN_n, a feature address 01h, and feature information data P1-P4 wherein in the example the feature data P1-P4 respectively carry information of 0x00 (but not limited). A third command sequence in FIG. 11, i.e. a set-feature signal, sequentially comprises the set-feature command D5h, the logical unit number address LUN_n, a feature address 02h, and feature information data P1-P4 wherein in the example the feature data P1-P4 respectively carry information of 0x10, 0x20, 0x30, and 0x40 (but not limited).

A fourth command sequence in FIG. 11, i.e. a set-feature signal, sequentially comprises the set-feature command D5h, the logical unit number address LUN_n, a feature address 03h, and feature information data P1-P4 wherein in the example the feature data P1-P4 respectively carry information of 0x01, 0x02, 0x03, and 0x04 (but not limited). A fifth command sequence in FIG. 11, i.e. a set-feature signal, sequentially comprises the set-feature command D5h, the logical unit number address LUN_n, a feature address 20h, and feature information data P1-P4 wherein in the example the feature data P1-P4 respectively carry information of 0x01, 0x02, 0x03, and 0x04 (but not limited). A sixth command sequence in FIG. 11, i.e. a set-feature signal, sequentially comprises the set-feature command D5h, the logical unit number address LUN_n, a feature address 10h, and feature information data P1-P4 wherein in the example the feature data P1-P4 respectively carry information of 0x10, 0x20, 0x30, and 0x40 (but not limited).

A seventh command sequence in FIG. 11, i.e. a first macro end signal, sequentially comprises the set-feature command D5h, the logical unit number address LUN_n, the macro end feature address BBh, and feature information data P1-P4 wherein in the example the feature data P1-P4 respectively carry information of 0x00, 0x05, 0x00, and 0x00 so as to indicate that this is an end tag for the first macro or group having the macro number 0 and its ending position is for example equal to 5 (but not limited). Since in this example the number of set-feature signals between the macro start signal and macro end signal is equal to five and the macro is the first macro or group, the ending position is equal to five.

After receiving the seven command sequences mentioned above, the flash memory device 110 can store the received information data into the first and second tables LUT1 and LUT2 updated in the following:

Example of Table LUT1:

| Macro number | Starting position | Ending position |
| --- | --- | --- |
| 0 | 0 | 3 |

Example of Table LUT2:

| Index value | Feature address | P1 | P2 | P3 | P4 |
| --- | --- | --- | --- | --- | --- |
| 0 | 0x01 | 0x00 | 0x00 | 0x00 | 0x00 |
| 1 | 0x02 | 0x10 | 0x20 | 0x30 | 0x40 |
| 2 | 0x03 | 0x01 | 0x02 | 0x03 | 0x04 |
| 3 | 0x20 | 0x01 | 0x02 | 0x03 | 0x04 |
| 4 | 0x10 | 0x10 | 0x20 | 0x30 | 0x40 |

Then, in the example, the second macro group comprises the set-feature operations identical to the set-feature operations corresponding to the feature addresses 0x20 and 0x10.

In FIG. 11, for transmitting a second macro or group of set-feature signals, for example (but not limited), the flash memory controller 105 sequentially sends two command sequences, e.g. a second macro start signal and a second macro end signal. In FIG. 11, an eighth command sequence, i.e. the second macro start signal, sequentially comprises the set-feature command D5h, a logical unit number address LUN_n, the macro start feature address AAh, and feature information data or parameters P1-P4 wherein the feature data P1-P4 respectively carry information of 0x01, 0x03, 0x00, and 0x00 so as to indicate that the macro number is equal to 1, the starting position is equal to 3, the simultaneous execution operation is disabled, and keeping the record (i.e. not clean the record). A ninth command sequence in FIG. 11, i.e. the second macro end signal, sequentially comprises the set-feature command D5h, the logical unit number address LUN_n, the macro end feature address BBh, and feature information data P1-P4 wherein in the example the feature data P1-P4 respectively carry information of 0x01, 0x05, 0x00, and 0x00 so as to indicate that this is an end tag for the second macro or group having the macro number 1 and its ending position is for example equal to 5 (but not limited).

Then, after receiving the two command sequences mentioned above, the flash memory device 110 can update the second table LUT2 based on the received information data; the second table LUT2 is updated in the following:

Example of Table LUT2:

| Macro number | Starting position | Ending position |
|---|---|---|
| 0 | 0 | 3 |
| 1 | 3 | 5 |

It should be noted that in this example the feature addresses of the set-feature operations comprised by the second macro group is identical to a subset comprised by the first macro group, and it is not needed to update the first table LUT1 when receiving the information of the second macro group. However, this is not meant to be a limitation of the invention.

Identically, the flash memory controller 105 can be arranged to send two command sequences to respectively trigger the flash memory device 110 executing the corresponding set-feature operations in FIG. 11 according to an embodiment of the invention. The two command sequences are identical to those shown in FIG. 9, and are not detailed for brevity.

Further, in other embodiments, the flash memory controller 105 can be arranged to send information of the command sequences based on a different format so that the flash memory device 110 can use only one table such as the first table LUT1 to record the received information of set-feature operation(s). Accordingly, the storage space allocated to the second table LUT2 can be released; that is, in one embodiment, the memory cell array 1107 excludes the second table LUT2.

Figure 12:
FIG. 12 is a diagram showing an example of using a set-feature signal carrying a macro start at the feature address as a macro start command sequence (or signal) according to another embodiment of the invention.

FIG. 12 is a diagram showing an example of using a set-feature signal carrying a macro start at the feature address as a macro start command sequence (or signal) according to another embodiment of the invention. In FIG. 12, the format of the macro start signal is also similar to that of a set-feature signal, and it sequentially comprises the set-feature command D5h (i.e. 0xD5), a logical unit number address such as LUN_n, the macro start feature address such as AAh (i.e. 0xAA, but not limited), and feature information data or parameters P1-P4 each being formed by one byte (i.e. eight bits, but not limited). The flash memory controller 105 can send the macro start signal in FIG. 12 to the flash memory device 110 so as to indicate that the set-feature signal(s) received in the following is/are associated with a start of a macro feature setting of the same group of set-feature operations, the LUN address LUN_n, and the corresponding parameter settings of the same group of set-feature operations. Compared to the embodiment of FIG. 4, the parameter data P1 of the macro start signal in FIG. 12 is used to indicate a starting position/tag of a specific group of set-feature operations and is not a macro number, the parameter data P2 of the macro start signal in FIG. 12 is used to indicate whether to execute the set-feature operations/functions simultaneously wherein a value 0x00 means disabling the operation of simultaneously executing the set-feature operations when setting while a value 0x01 means enabling the operation of simultaneously executing the set-feature operations when setting, the parameter data P3 of the macro start signal in FIG. 12 is used to indicate whether to clear/clean a corresponding macro record wherein a value 0x00 means keeping the macro record while a value 0x01 means clearing/cleaning the macro record into the default value such as all '0' or all '1', and the parameter data P4 in FIG. 12 may be reserved. Thus, when receiving the macro start signal in FIG. 12, the flash memory device 110 can know that a same group of set-feature operations/signals can be received in the following and also knows the macro or common settings for the same group of set-feature operations.

Figure 13:
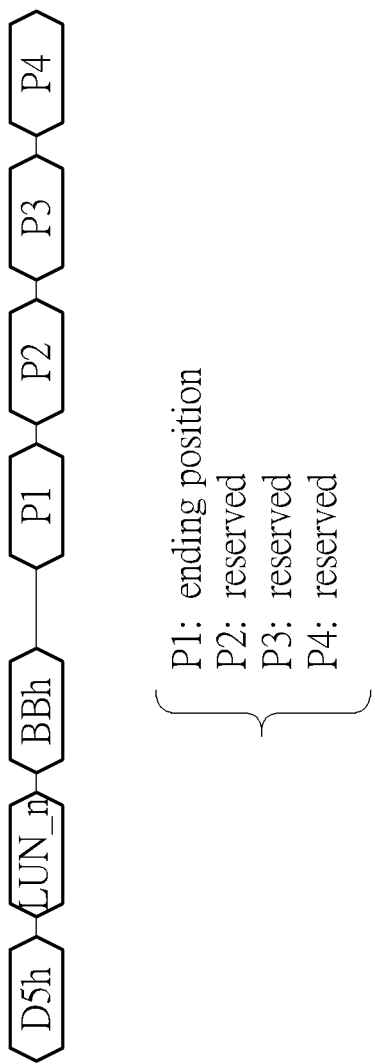
FIG. 13 is a diagram showing an example of using a set-feature signal carrying a macro end at the feature address as a macro end signal according to another embodiment of the invention.

FIG. 13 is a diagram showing an example of using a set-feature signal carrying a macro end at the feature address as a macro end signal according to another embodiment of the invention. In FIG. 13, the macro end signal sequentially comprises the set-feature command D5h (i.e. 0xD5), a logical unit number address such as LUN_n, the macro end address such as BBh (i.e. 0xBB, but not limited), and feature information data or parameters P1-P4 each being formed by one byte (i.e. eight bits, but not limited). The flash memory controller 105 can send the macro end signal in FIG. 13 to the flash memory device 110 so as to indicate that the signal follows an end of a group of set-feature operations, the LUN address LUN_n, and the corresponding parameter data of the macro feature setting of the same group of set-feature operations. Compared to the embodiment of FIG. 5, for example, the parameter data P1 of the macro end signal in FIG. 13 is used to indicate the ending position/tag of a specific group of set-feature operations, and the other parameter data P2, P3, and P4 may be reserved. Thus, when receiving the macro end signal in FIG. 13, the flash memory device 110 can know that receiving a group of set-feature operations/signals has been finished.

Figure 14:
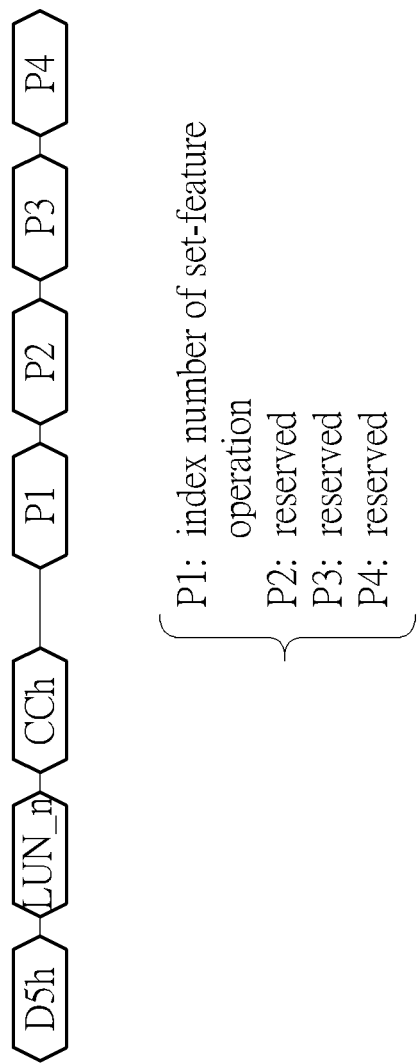
FIG. 14 is a diagram showing an example of using a set-feature signal carrying a macro execution at the feature address as a macro execution signal according to another embodiment of the invention.

FIG. 14 is a diagram showing an example of using a set-feature signal carrying a macro execution at the feature address as a macro execution signal according to another embodiment of the invention. In FIG. 14, the macro execution signal sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) The flash memory controller 105 can send the macro execution signal in FIG. 14 to the flash memory device 110 so as to indicate that the signal is associated with an execution of the macro feature setting of the same group of set-feature operations, the LUN address LUN_n, and the corresponding parameter data of the macro feature setting of the same group of set-feature operations. Compared to the embodiment in FIG. 6, for example, the parameter data P1 of the macro execution signal in FIG. 14 is used to indicate a specific set-feature operation's index value/number which is a starting position to be executed by the flash memory device 110, and the parameter data P2, P3, and P4 may be reserved. Thus, when receiving the macro execution signal in FIG. 14, the flash memory device 110 can be arranged to execute the starting set-feature operation and subsequent set-feature operation(s) if it is needed. The above set-feature information mentioned in FIG. 12, FIG. 13, and FIG. 14 can be stored or recorded in the flash memory device 110 by using only one table such as the first table LUT1.

Figure 15:
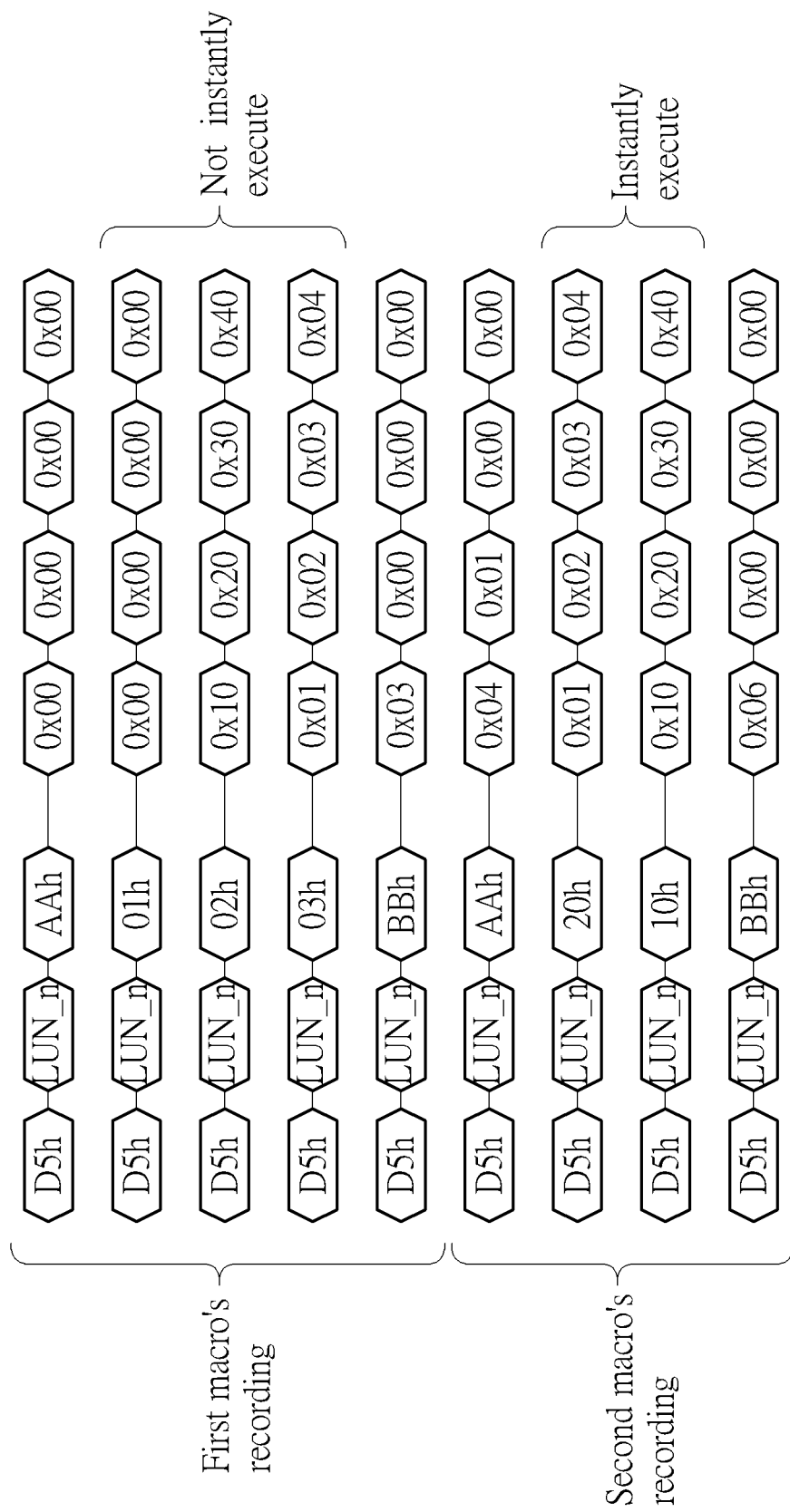
FIG. 15 is a diagram of an example of the flash memory controller 105 sequentially transmitting a sequence of command sequences to set two macro groups of set-feature operations based on the signal formats in FIG. 12 and FIG. 13 according to another embodiment of the invention.

FIG. 15 is a diagram of an example of the flash memory controller 105 sequentially transmitting a sequence of command sequences to set two macro groups of set-feature operations based on the signal formats in FIG. 12 and FIG. 13 according to another embodiment of the invention. In FIG. 15, the total number of command sequence for example is equal to nine. For transmitting a first macro or group of set-feature signals, for example (but not limited), the flash memory controller 105 sequentially sends five command sequences, e.g. a macro start signal, three different set-feature signals, and a macro end signal. A first command sequence, i.e. a first macro start signal, sequentially comprises the set-feature command D5h, a logical unit number address LUN_n, the macro start feature address AAh, and feature information data or parameters P1-P4 wherein the feature data P1-P4 respectively carry information of 0x00, 0x00, 0x01, and 0x00 so as to indicate the starting position is equal to 0, the simultaneous execution operation is disabled (i.e. not instantly executing the set-feature operations), and clearing/cleaning the macro record into a default value. The second, third, and fourth command sequence are set-feature signals which respectively comprise the information data shown in FIG. 15 and are not detailed for brevity. A fifth command sequence, i.e. a first macro end signal, sequentially comprises the set-feature command D5h, the logical unit number address LUN_n, the macro end feature address BBh, and feature information data P1-P4 wherein in the example the feature data P1-P4 respectively carry information of 0x03, 0x00, 0x00, and 0x00 so as to indicate that an ending position is for example equal to 3 (but not limited).

Similarly, in FIG. 15, for transmitting a second macro or group of set-feature signals, for example (but not limited), the flash memory controller 105 sequentially sends four command sequences, e.g. a second macro start signal, two set-feature signals, and a second macro end signal. In FIG. 15, a sixth command sequence, i.e. the second macro start signal, sequentially comprises the set-feature command D5h, a logical unit number address LUN_n, the macro start feature address AAh, and feature information data or parameters P1-P4 wherein the feature data P1-P4 respectively carry information of 0x04, 0x01, 0x00, and 0x00 so as to indicate that the starting position is equal to 4, the simultaneous execution operation is enabled (i.e. instantly executing the set-feature operations), and keeping the record (i.e. not clean the record). The seventh and eighth command sequences are set-feature signals which respectively comprise the information data shown in FIG. 15 and are not detailed for brevity. A ninth command sequence, i.e. the second macro end signal, sequentially comprises the set-feature command D5h, the logical unit number address LUN_n, the macro end feature address BBh, and feature information data P1-P4 wherein in the example the feature data P1-P4 respectively carry information of 0x06, 0x00, 0x00, and 0x00 so as to indicate that an ending position is for example equal to 6 (but not limited). The above-mentioned examples are not limitations of the invention.

The flash memory device 110 can use only the first table LUT1 to respectively store the stating/ending positions (i.e. index values/numbers), feature addresses, and parameter data of all set-feature signals as follows:

Example of Table LUT1:

| Index value | Feature address | P1 | P2 | P3 | P4 |
|---|---|---|---|---|---|
| 0 | 0x01 | 0x00 | 0x00 | 0x00 | 0x00 |
| 1 | 0x02 | 0x10 | 0x20 | 0x30 | 0x40 |
| 2 | 0x03 | 0x01 | 0x02 | 0x03 | 0x04 |
| 3 | End | | | | |
| 4 | 0x20 | 0x01 | 0x02 | 0x03 | 0x04 |
| 5 | 0x10 | 0x10 | 0x20 | 0x30 | 0x40 |
| 6 | End | | | | |

As shown in the table LUT1, when receiving a macro end signal which carries an ending position/tag, the flash memory device 110 is arranged to mark or tag 'End' information at the feature address field corresponding to the ending position/tag in the table LUT1. In this embodiment, no macro numbers are not used, and thus the second table LUT2 is not used so that the storage space can be released. However, this is not a limitation of the invention.

Figure 16:
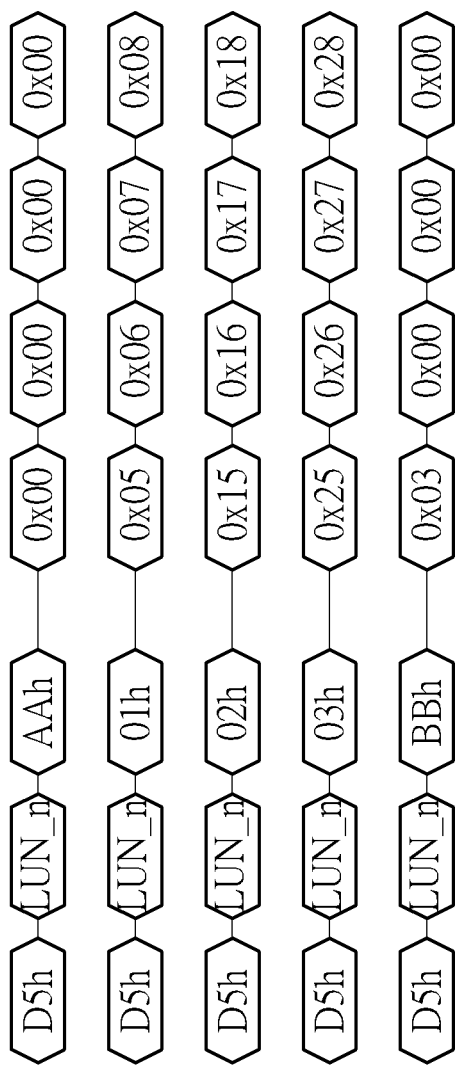
FIG. 16 is a diagram of an example of the flash memory controller sequentially transmitting a sequence of command sequences to modify parameter data of the set-feature operations according to another embodiment of the invention.

Also, the flash memory controller 105 can send a group of set-feature signals by using the macro start signal and macro end signal to appropriate modify the information data stored in the first table LUT1. FIG. 16 is a diagram of an example of the flash memory controller 105 sequentially transmitting a sequence of command sequences to modify parameter data of the set-feature operations according to another embodiment of the invention. In FIG. 16, the total number of command sequence for example is equal to five. For example (but not limited), the flash memory controller 105 sequentially sends five command sequences, e.g. a macro start signal, three different set-feature signals, and a macro end signal. A first command sequence, i.e. the macro start signal, sequentially comprises the set-feature command D5h, a logical unit number address LUN_n, the macro start feature address AAh, and feature information data or parameters P1-P4 wherein the feature data P1-P4 respectively carry information of 0x00, 0x00, 0x00, and 0x00 so as to indicate that the starting position is equal to 0, the simultaneous execution operation is disabled (the previous setting is 'enabled'), and keeping the macro record (the previous setting is 'clearing'). The second, third, and fourth command sequence are set-feature signals which respectively comprise the information data shown in FIG. 16 and are not detailed for brevity. A fifth command sequence, i.e. the macro end signal, sequentially comprises the set-feature command D5h, the logical unit number address LUN_n, the macro end feature address BBh, and feature information data P1-P4 wherein in the example the feature data P1-P4 respectively carry information of 0x03, 0x00, 0x00, and 0x00 so as to indicate that an ending position is for example equal to 3 (but not limited).

Thus, when receiving the above-mentioned command sequences in FIG. 16, the flash memory device 110 can update the corresponding parameter data fields of the feature addresses 0x01, 0x02, and 0x03 previously stored in the first table LUT1 as follows:

Example of Updated Table LUT1:

| Index value | Feature address | P1 | P2 | P3 | P4 |
|---|---|---|---|---|---|
| 0 | 0x01 | 0x05 | 0x06 | 0x07 | 0x08 |
| 1 | 0x02 | 0x15 | 0x16 | 0x17 | 0x18 |
| 2 | 0x03 | 0x25 | 0x26 | 0x27 | 0x28 |
| 3 | End | | | | |
| 4 | 0x20 | 0x01 | 0x02 | 0x03 | 0x04 |
| 5 | 0x10 | 0x10 | 0x20 | 0x30 | 0x40 |
| 6 | End | | | | |

Figure 17:
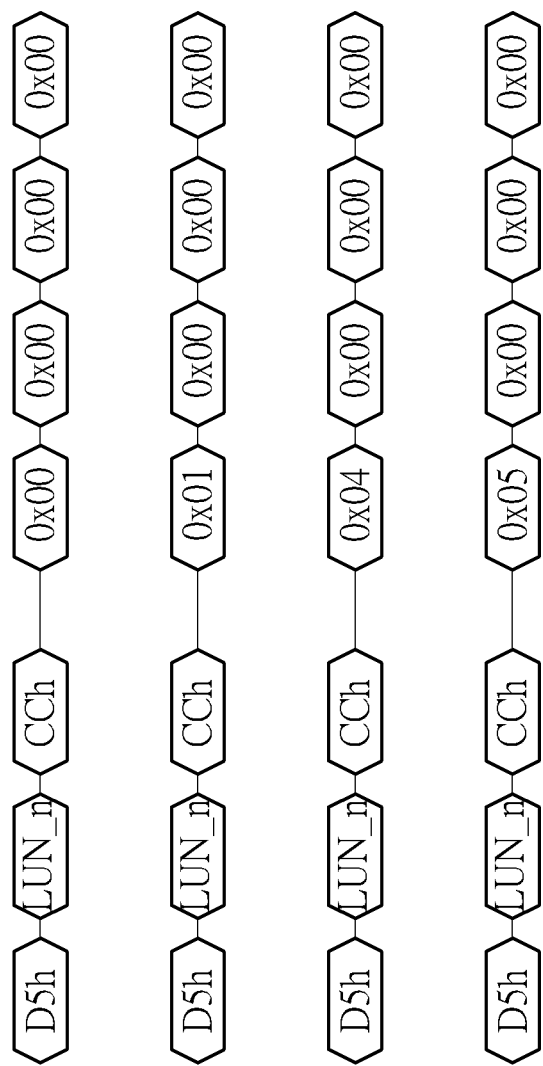
FIG. 17 is a diagram of different examples of the flash memory controller sending four command sequences to respectively trigger the flash memory device executing the corresponding set-feature operations based on the first table LUT1 according to an embodiment of the invention.

In addition, for controlling the flash memory device 110 executing one or more set-feature operations recorded in the first table LUT1 mentioned above, the flash memory controller 105 can send a macro execution signal based on the format defined in FIG. 14. FIG. 17 is a diagram of different examples of the flash memory controller 105 sending four command sequences to respectively trigger the flash memory device 110 executing the corresponding set-feature operations based on the first table LUT1 according to an embodiment of the invention. In FIG. 17, the flash memory controller 105 uses a set-feature signal carrying a macro execution at the feature address as a macro execution command sequence (or signal). For example, a first command sequence in FIG. 17, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x00 to indicate that a starting position of index value (s) of the set-feature operation(s) to be executed is equal to 0 while the other feature data P2-P4 are reserved which may be indicated by the default value 0x00. Thus, when receiving such command sequence, the flash memory device 110 can be arranged to sequentially execute the set-feature operation(s) from the starting index value position 0 until the feature address field corresponding to a current index value position is equal to the information of 'End'. That is, in this situation, the flash memory controller 105 can control the flash memory device 110 sequentially executing the set-feature operations corresponding to the index value positions 0, 1, and 2 (i.e. the feature addresses 0x01, 0x02, 0x03).

Similarly, a second command sequence in FIG. 17, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x01 to indicate that a stating index value position of the set-feature operation(s) to be executed is equal to 1 while the other feature data P2-P4 are reserved which may be indicated by the default value 0x00. Thus, when receiving such command sequence, the flash memory device 110 can be arranged to sequentially execute the set-feature operation(s) from the starting index value position 1 until the feature address field corresponding to a current index value position is equal to the information of 'End'. That is, in this situation, the flash memory controller 105 can control the flash memory device 110 sequentially executing the set-feature operations corresponding to the index value positions 1 and 2 (i.e. the feature addresses 0x02 and 0x03).

Similarly, a third command sequence in FIG. 17, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x04 to indicate that a stating index value position to be executed is equal to 4 while the other feature data P2-P4 are reserved which may be indicated by the default value 0x00. Thus, when receiving such command sequence, the flash memory device 110 can be arranged to sequentially execute the set-feature operation(s) from the starting index value position 4 until the feature address field corresponding to a current index value position is equal to the information of 'End'. That is, in this situation, the flash memory controller 105 can control the flash memory device 110 sequentially executing the set-feature operations corresponding to the index value positions 4 and 5 (i.e. the feature addresses 0x20 and 0x10).

Similarly, a fourth command sequence in FIG. 17, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x05 to indicate that a stating index value position to be executed is equal to 5 while the other feature data P2-P4 are reserved which may be indicated by the default value 0x00. Thus, when receiving such command sequence, the flash memory device 110 can be arranged to sequentially execute the set-feature operation(s) from the starting index value position 5 until the feature address field corresponding to a current index value position is equal to the information of 'End'. That is, in this situation, the flash memory controller 105 can control the flash memory device 110 executing only the set-feature operation corresponding to the index value position 5 (i.e. the feature address 0x10).

Figure 18:
FIG. 18 is a diagram showing an example of using a set-feature signal carrying a macro information at the feature address as a macro start/end command sequence (or signal) according to another embodiment of the invention.

Further, in other embodiments, a macro start signal and a macro end signal can be respectively implemented by using the same macro feature address. FIG. 18 is a diagram showing an example of using a set-feature signal carrying a macro information at the feature address as a macro start/end command sequence (or signal) according to another embodiment of the invention. In FIG. 18, the format of the macro start/end signal sequentially comprises the set-feature command D5h (i.e. 0xD5), a logical unit number address such as LUN_n, the macro feature address such as AAh (i.e. 0xAA, but not limited), and feature information data or parameters P1-P4 each being formed by one byte (i.e. eight bits, but not limited). The flash memory controller 105 can send the macro start/end signal in FIG. 18 to the flash memory device 110 so as to indicate that the set-feature signal(s) received in the following is/are associated with a start/end of a macro feature setting of the same group of set-feature operations, the LUN address LUN_n, and the corresponding parameter data of the macro feature setting of the same group of set-feature operations.

In FIG. 18, the parameter data P1 is used to indicate a starting position/tag of a specific group of set-feature operations, the parameter data P2 is used to indicate whether to execute the set-feature operations/functions simultaneously/ instantly wherein a value 0x00 means disabling the operation of simultaneously executing the set-feature operations when setting while a value 0x01 means enabling the operation of simultaneously executing the set-feature operations when setting, the parameter data P3 is used to indicate whether to clear/clean a corresponding macro record wherein a value 0x00 means keeping the macro record while a value 0x01 means clearing/cleaning the macro record into the default value such as all '0' or all '1', and the parameter data P4 is used to indicate that this macro signal is used as a macro start signal or as a macro end signal wherein a value 0x00 means a macro start signal used to start to record set-feature settings while a value 0x01 means a macro end signal used to finish the set-feature settings. Thus, based on the value of parameter data P4, the flash memory device 110 can know whether a specific group of set-feature operations/signals will be received in the following or receiving the specific group of set-feature operations/signals will be finished.

Figure 19:
FIG. 19 is a diagram showing an example of using a set-feature signal carrying a macro execution at the feature address as a macro execution signal according to another embodiment of the invention.

FIG. 19 is a diagram showing an example of using a set-feature signal carrying a macro execution at the feature address as a macro execution signal according to another embodiment of the invention. In FIG. 19, the macro execution signal sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited). The flash memory controller 105 can send the macro execution signal in FIG. 19 to the flash memory device 110 so as to indicate that the signal is associated with an execution of the macro feature setting of the same group of set-feature operations, the LUN address LUN_n, and the corresponding parameter data of the macro feature setting of the same group of set-feature operations. For example, the parameter data P1 of the macro execution signal in FIG. 19 is used to indicate a starting index value/position of a specific group of set-feature operations, the parameter data P2 in FIG. 19 is used to indicate the macro amounts of set-feature operation(s) to be executed by the flash memory device 110, and the parameter data P3 and P4 may be reserved. Thus, when receiving the macro execution signal in FIG. 19, the flash memory device 110 can be arranged to execute one or more corresponding set-feature operations based on the starting position/index value and the number of operation(s) to be executed.

Figure 20:
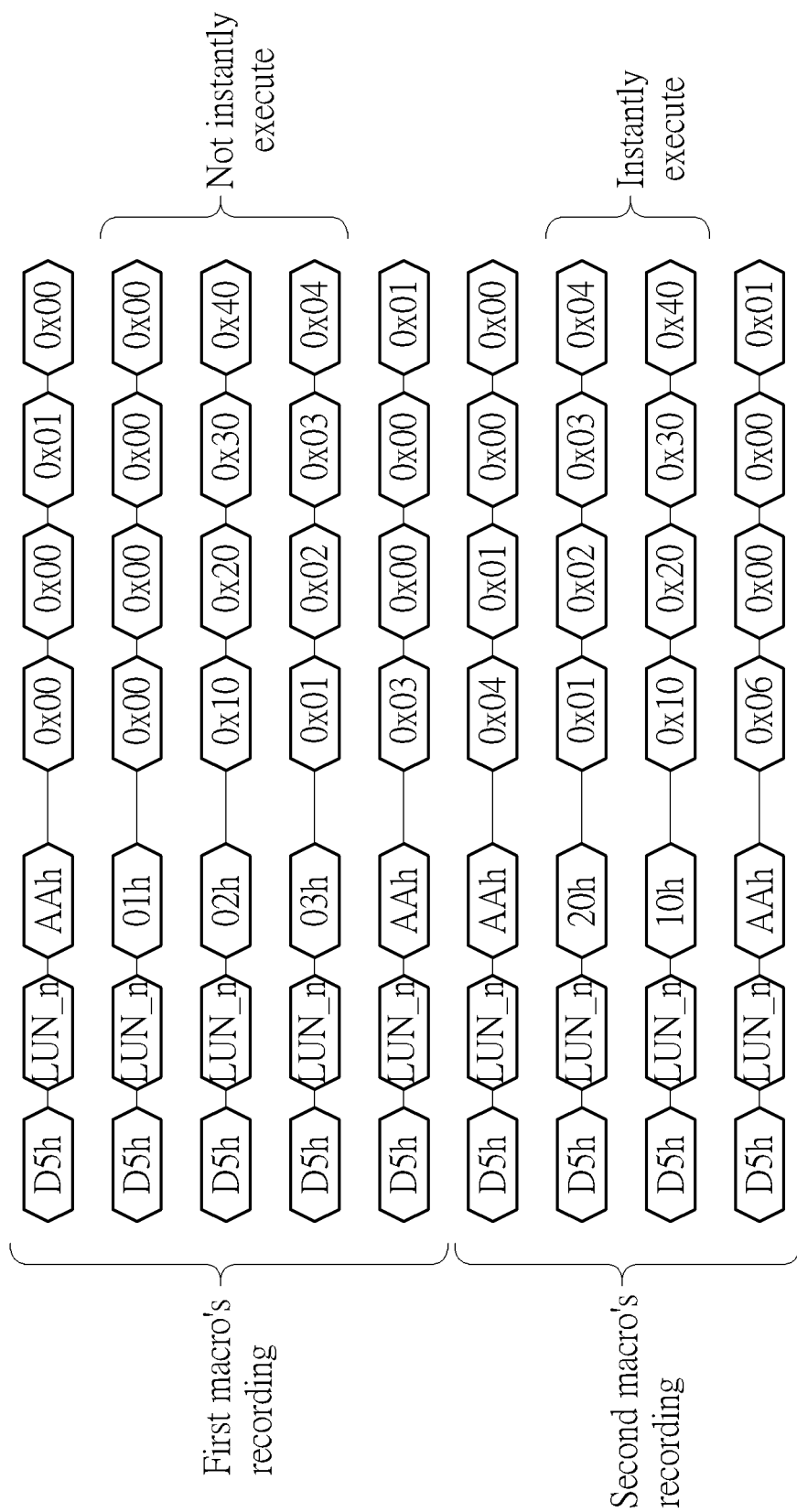
FIG. 20 is a diagram of an example of the flash memory controller sequentially transmitting a sequence of command sequences to set two macro groups of set-feature operations based on the signal format of FIG. 18 according to another embodiment of the invention.

FIG. 20 is a diagram of an example of the flash memory controller 105 sequentially transmitting a sequence of command sequences to set two macro groups of set-feature operations based on the signal format of FIG. 18 according to another embodiment of the invention. In FIG. 20, the total number of command sequence for example is equal to nine. For transmitting a first macro or group of set-feature signals, for example (but not limited), the flash memory controller 105 sequentially sends five command sequences, e.g. a macro start signal, three different set-feature signals, and a macro end signal. A first command sequence, i.e. a first macro start signal, sequentially comprises the set-feature command D5h, a logical unit number address LUN_n, the macro feature address such as AAh, and feature information data or parameters P1-P4 wherein the feature data P1-P4 respectively carry information of 0x00, 0x00, 0x01, and 0x00 so as to indicate that the starting position is equal to 0, the simultaneous execution operation is disabled, cleaning/clearing the macro record into the default value, and this macro signal being used as the macro start signal. The second, third, and fourth command sequence are set-feature signals which respectively comprise the information data shown in FIG. 20 and their operations are not instantly and simultaneously executed when being received. A fifth command sequence, i.e. a first macro end signal, sequentially comprises the set-feature command D5h, the logical unit number address LUN_n, the macro feature address such as AAh, and feature information data P1-P4 wherein in the example the feature data P1-P4 respectively carry information of 0x03, 0x00, 0x00, and 0x01 so as to indicate that an ending position is for example equal to 3 (but not limited) and this macro signal being used as a macro end signal.

Similarly, in FIG. 20, for transmitting a second macro or group of set-feature signals, for example (but not limited), the flash memory controller 105 sequentially sends four command sequences, e.g. a second macro start signal, two set-feature signals, and a second macro end signal. In FIG. 20, a sixth command sequence, i.e. the second macro start signal, sequentially comprises the set-feature command D5h, a logical unit number address LUN_n, the macro feature address such as AAh, and feature information data or parameters P1-P4 wherein the feature data P1-P4 respectively carry information of 0x04, 0x01, 0x00, and 0x00 so as to indicate that the starting position is equal to 4, the simultaneous execution operation is enabled, keeping the record (i.e. not clean the record), and this macro signal being used as a macro start signal. The seventh and eighth command sequences are set-feature signals which respectively comprise the information data shown in FIG. 20 and their operations are instantly and simultaneously executed when they are received by the flash memory device 110. A ninth command sequence, i.e. the second macro end signal, sequentially comprises the set-feature command D5h, the logical unit number address LUN_n, the macro feature address such as AAh, and feature information data P1-P4 wherein in the example the feature data P1-P4 respectively carry information of 0x06, 0x00, 0x00, and 0x01 so as to indicate that an ending position is for example equal to 6 (but not limited) and this macro signal being used as a macro end signal. The above-mentioned examples are not limitations of the invention.

The flash memory device 110 can use only the first table LUT1 to respectively store the index values/numbers, feature addresses, and parameter data of all set-feature signals in FIG. 20 as follows:

Example of Table LUT1:

| Index value | Feature address | P1 | P2 | P3 | P4 |
|---|---|---|---|---|---|
| 0 | 0x01 | 0x00 | 0x00 | 0x00 | 0x00 |
| 1 | 0x02 | 0x10 | 0x20 | 0x30 | 0x40 |
| 2 | 0x03 | 0x01 | 0x02 | 0x03 | 0x04 |
| 3 | 0x20 | 0x01 | 0x02 | 0x03 | 0x04 |
| 4 | 0x10 | 0x10 | 0x20 | 0x30 | 0x40 |

Figure 21:
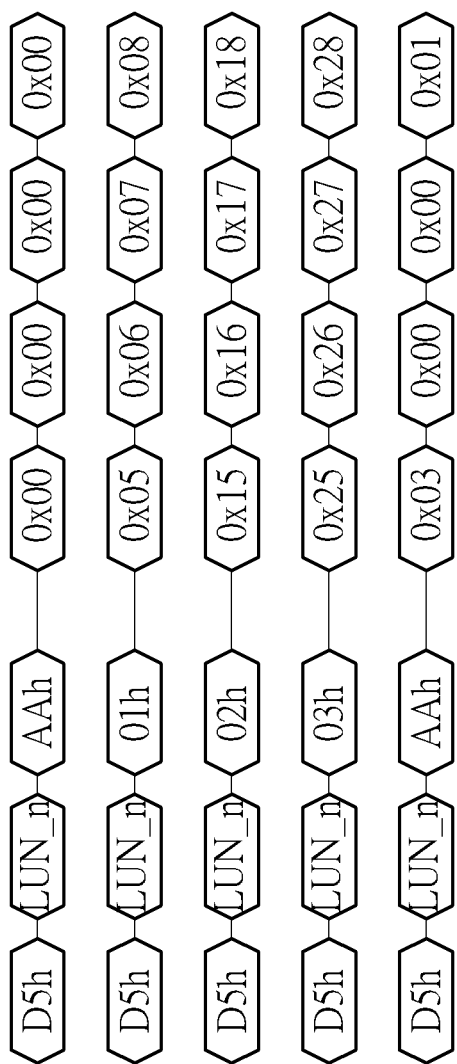
FIG. 21 is a diagram of an example of the flash memory controller sequentially transmitting a sequence of command sequences to modify parameter data of the set-feature operations based on the signal format of FIG. 18 according to another embodiment of the invention.

Also, the flash memory controller 105 can send a group of set-feature signals by using the macro start signal and macro end signal to appropriate modify the information data stored in the fourth table. FIG. 21 is a diagram of an example of the flash memory controller 105 sequentially transmitting a sequence of command sequences to modify parameter data of the set-feature operations based on the signal format of FIG. 18 according to another embodiment of the invention. In FIG. 21, the total number of command sequence for example is equal to five. For example (but not limited), the flash memory controller 105 sequentially sends five command sequences, e.g. a macro start signal, three different set-feature signals, and a macro end signal. A first command sequence, i.e. the macro start signal, sequentially comprises the set-feature command D5h, a logical unit number address LUN_n, the macro feature address such as AAh, and feature information data or parameters P1-P4 wherein the feature data P1-P4 respectively carry information of 0x00, 0x00, 0x00, and 0x00 so as to indicate that the starting position is equal to 0, the simultaneous execution operation is disabled, cleaning/clearing the record, and this macro signal being used as a macro start signal. The second, third, and fourth command sequence are set-feature signals which respectively comprise the information data shown in FIG. 21 and are not detailed for brevity. A fifth command sequence, i.e. the macro end signal, sequentially comprises the set-feature command D5h, the logical unit number address LUN_n, the same macro feature address AAh, and feature information data P1-P4 wherein in the example the feature data P1-P4 respectively carry information of 0x03, 0x00, 0x00, and 0x01 so as to indicate that an ending position is for example equal to 3 (but not limited) and this macro signal being used as a macro end signal.

Thus, when receiving the above-mentioned command sequences in FIG. 21, the flash memory device 110 can update the corresponding parameter data fields of the feature addresses 0x01, 0x02, and 0x03 previously stored in the first table LUT1 as follows:

The updated fourth table:

| Index value | Feature address | P1 | P2 | P3 | P4 |
| --- | --- | --- | --- | --- | --- |
| 0 | 0x01 | 0x05 | 0x06 | 0x07 | 0x08 |
| 1 | 0x02 | 0x15 | 0x16 | 0x17 | 0x18 |
| 2 | 0x03 | 0x25 | 0x26 | 0x27 | 0x28 |
| 3 | 0x20 | 0x01 | 0x02 | 0x03 | 0x04 |
| 4 | 0x10 | 0x10 | 0x20 | 0x30 | 0x40 |

Figure 22:
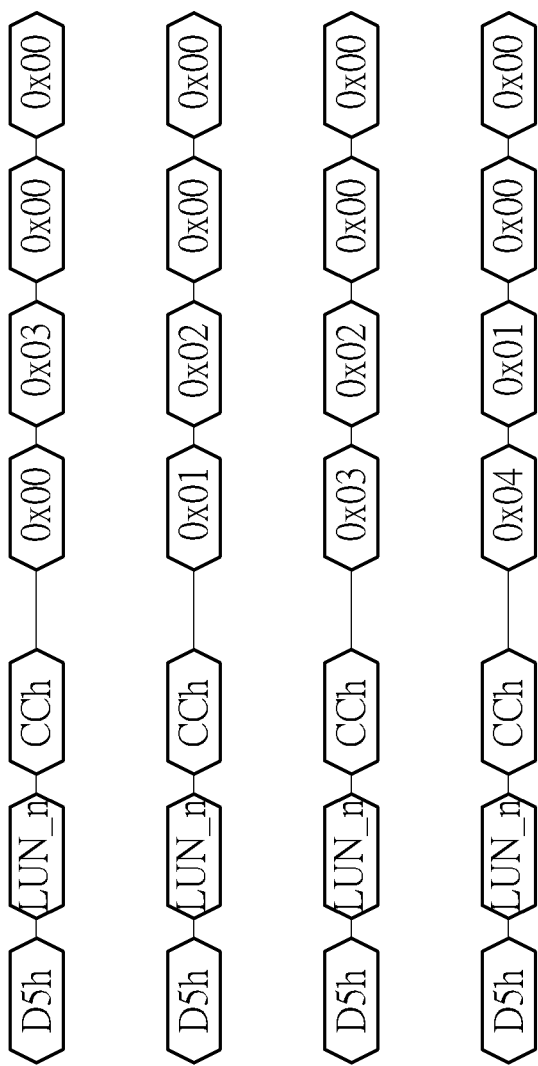
FIG. 22 is a diagram of different examples of the flash memory controller sending four command sequences to respectively trigger the flash memory device executing the corresponding set-feature operations based on the fourth table according to an embodiment of the invention.

For controlling the flash memory device 110 executing one or more set-feature operations recorded in the fourth table LUT1, the flash memory controller 105 can send a macro execution signal based on the format defined in FIG. 19. FIG. 22 is a diagram of different examples of the flash memory controller 105 sending four command sequences to respectively trigger the flash memory device 110 executing the corresponding set-feature operations based on the fourth table according to an embodiment of the invention. In FIG. 22, the flash memory controller 105 uses a set-feature signal carrying a macro execution at the feature address as a macro execution command sequence (or signal). For example, a first command sequence in FIG. 22, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x00 to indicate that a stating index value position of an operation to be executed is equal to zero, the feature data P2 carries information of 0x03 to indicate that the amount of operations to be executed is equal to three, and the other feature data P3 and P4 are reserved which may be indicated by the default value 0x00. Thus, when receiving such command sequence, the flash memory device 110 can be arranged to sequentially execute the set-feature operation(s) corresponding to the index value positions 0, 1, and 2 (i.e. the feature addresses 0x01, 0x02, 0x03).

Similarly, a second command sequence in FIG. 22, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x01 to indicate that a stating index value position to be executed is equal to 1, the feature data P2 carries information of 0x02 to indicate that the amount of operations to be executed is equal to 2, and the other feature data P3 and P4 are reserved which may be indicated by the default value 0x00. Thus, when receiving such command sequence, the flash memory device 110 can be arranged to sequentially execute the set-feature operations corresponding to the index value positions 1 and 2 (i.e. the feature addresses 0x02 and 0x03).

Similarly, a third command sequence in FIG. 22, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x03 to indicate that a stating index value position to be executed is equal to 3, the feature data P2 carries information of 0x02 to indicate that the amount of operations to be executed is equal to 2, and the other feature data P3 and P4 are reserved which may be indicated by the default value 0x00. Thus, when receiving such command sequence, the flash memory device 110 can be arranged to sequentially execute the set-feature operations corresponding to the index value positions 3 and 4 (i.e. the feature addresses 0x20 and 0x10).

Similarly, a fourth command sequence in FIG. 22, sent by the flash memory controller 105, sequentially comprises the set-feature command D5h (i.e. 0xD5), a logical unit number address such as LUN_n, the macro execution feature address such as CCh (i.e. 0xCC, but not limited), and feature information data or parameters P1-P4 each being formed by one byte (i.e. eight bits, but not limited) wherein the feature data P1 carries information of 0x04 to indicate that a stating index value position to be executed is equal to 4, the feature data P2 carries information of 0x01 to indicate that the amount of operations to be executed is equal to 1, and the other feature data P3 and P4 are reserved which may be indicated by the default value 0x00. Thus, when receiving such command sequence, the flash memory device 110 can be arranged to sequentially execute only the set-feature operation corresponding to the index value position 4 (i.e. the feature address 0x10).

Figure 23:
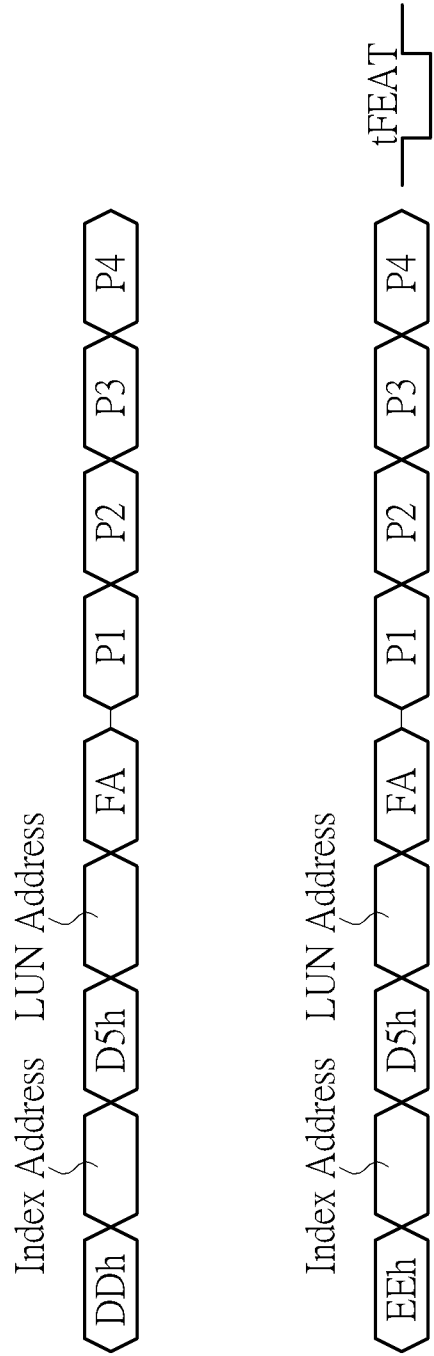
FIG. 23 is a diagram of two different example command formats of adding a prefix command sequence before a command sequence of a set-feature signal to achieve using one macro execution command to execute multiple set-feature operations according to an embodiment of the invention.

Further, in other embodiments, the flash memory controller 105 may be arranged to add a prefix command sequence before a command sequence of a set-feature signal to generate a new command sequence in which the prefix command sequence is followed by the set-feature signal, and transmit such new command sequence to the flash memory device 110 so as to achieve the settings and/or execution of a set-feature operation. FIG. 23 is a diagram of two different example command formats of adding a prefix command sequence before a command sequence of a set-feature signal to achieve using one macro execution command to execute multiple set-feature operations according to an embodiment of the invention. In FIG. 23, the flash memory controller 105 employs adding a prefix command sequence without using a macro start signal and a macro end signal. The format of a first command sequence, sent by the flash memory controller 105, sequentially comprises a prefix command such as DDh (but not limited), an index value position/address, the set-feature command D5h, the LUN address, the feature address FA, and the parameter information/data P1-P4 each being formed by one byte (i.e. eight bits, but not limited). In this example, the prefix command DDh is used to indicate that this set-feature operation is not instantly executed by the flash memory device 110 after it is received by the flash memory controller 105, and thus no time tFEAT, i.e. a busy time of the execution of set-feature operations of the flash memory device 110, follows this command sequence. The flash memory device 110 can store the index value position, the feature address FA, and the corresponding parameter data into a table of the memory cell array. It should be noted that the information of the parameter data P1-P4 in FIG. 23 is associated with the settings of this set-feature operation corresponding to the feature address FA, and is different from and also not associated with the settings of a macro start/end signal.

Similarly, the format of a second command sequence, sent by the flash memory controller 105, sequentially comprises another different prefix command such as EEh (but not limited), an index value position/address, the set-feature command D5h, the LUN address, the feature address FA, and the parameter information/data P1-P4 each being formed by one byte (i.e. eight bits, but not limited). In this example, the prefix command EEh is used to indicate that this set-feature operation is instantly executed by the flash memory device 110 after it is received by the flash memory controller 105, and thus a busy time tFEAT of the execution of set-feature operations of the flash memory device 110, follows this command sequence. The flash memory device 110 can store the index value position, the feature address FA, and the corresponding parameter data into a table of the memory cell array. It should be noted that the information of the parameter data P1-P4 in FIG. 23 is associated with the settings of this set-feature operation corresponding to the feature address FA, and is different from and also not associated with the settings of a macro start/end signal.

In addition, the flash memory controller 105 can also use a set-feature signal carrying a macro execution at the feature address as a macro execution signal, and the command format is identical to that of FIG. 19 and is not detailed for brevity.

Figure 24:
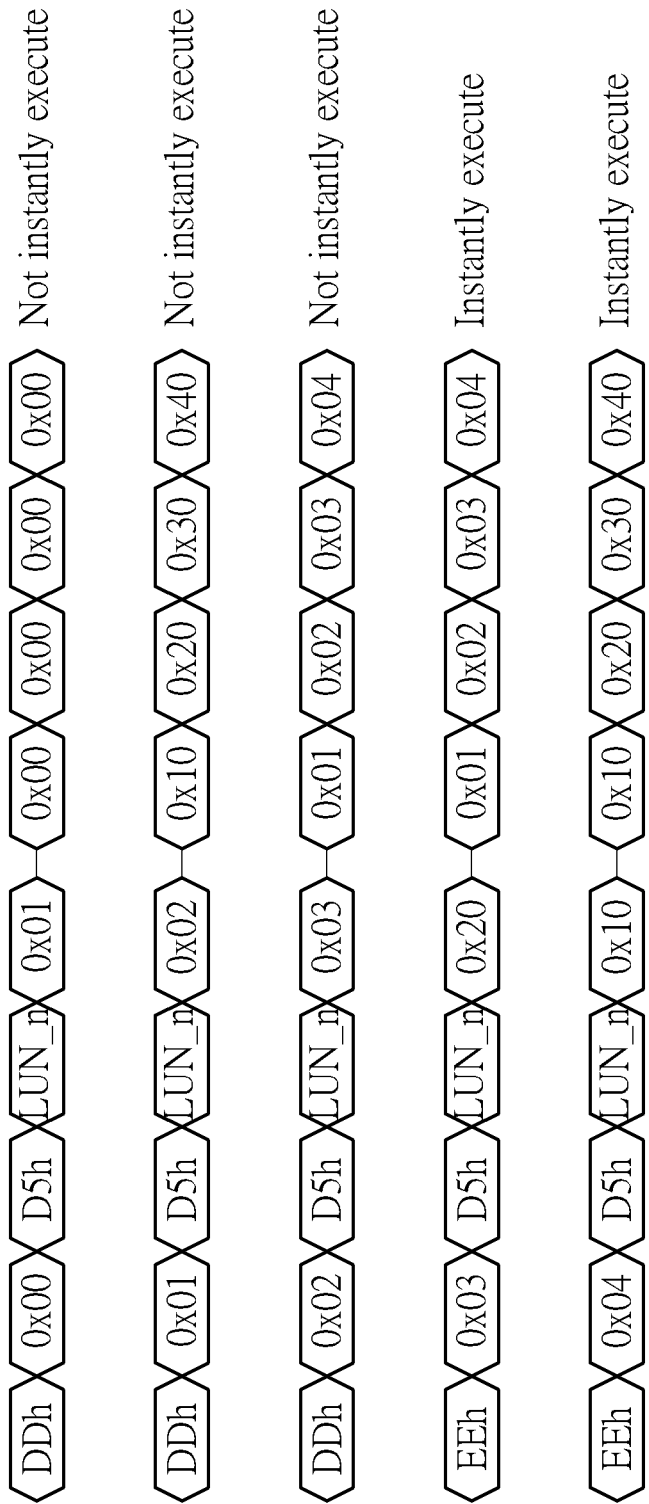
FIG. 24 is a diagram of an example of the flash memory controller sequentially transmitting a sequence of command sequences to set multiple set-feature operations based on the signal/command format of FIG. 23 according to another embodiment of the invention.

FIG. 24 is a diagram of an example of the flash memory controller 105 sequentially transmitting a sequence of command sequences to set multiple set-feature operations based on the signal/command format of FIG. 23 according to another embodiment of the invention. In FIG. 24, the total number of command sequence for example is equal to five. For example (but not limited), the flash memory controller 105 sequentially sends five command sequences respectively comprising five different set-feature signals. In FIG. 24, a first command sequence sequentially comprises the prefix command such as DDh, the index value position address/information such as 0x00, the set-feature command D5h, a logical unit number address LUN_n, the feature address such as 0x01, and feature information data or parameters P1-P4 wherein the feature data P1-P4 respectively carry information of 0x00, 0x00, 0x00, and 0x00. Thus, after receiving this command sequence, the flash memory device 110 can be arranged to disable the simultaneous execution operation (i.e. not instantly executing the set-feature operation after this set-feature is received) and to store the index value position (i.e. 0), the feature address 0x01, and corresponding parameter data into the table LUT1 of the memory cell array.

A second command sequence in FIG. 24 sequentially comprises the prefix command such as DDh, the index value position address/information such as 0x01, the set-feature command D5h, a logical unit number address LUN_n, the feature address such as 0x02, and feature information data or parameters P1-P4 such as 0x10, 0x20, 0x30, and 0x40. Thus, after receiving this command sequence, the flash memory device 110 can be arranged to disable the simultaneous execution operation of the set-feature operation (i.e. not instantly executing the set-feature operation after this set-feature is received) and to store the index value position (i.e. 1), the feature address 0x02, and corresponding parameter data into the table LUT1 of the memory cell array 1107.

A third command sequence in FIG. 24 sequentially comprises the prefix command such as DDh, the index value position address/information such as 0x02, the set-feature command D5h, a logical unit number address LUN_n, the feature address such as 0x03, and feature information data or parameters P1-P4 such as 0x01, 0x02, 0x03, and 0x04. Thus, after receiving this command sequence, the flash memory device 110 can be arranged to disable the simultaneous execution operation of the set-feature operation (i.e. not instantly executing the set-feature operation after this set-feature is received) and to store the index value position (i.e. 2), the feature address 0x03, and corresponding parameter data into the table LUT1 of the memory cell array 1107.

A fourth command sequence in FIG. 24 sequentially comprises the prefix command such as EEh, the index value position address/information such as 0x03, the set-feature command D5h, a logical unit number address LUN_n, the feature address such as 0x20, and feature information data or parameters P1-P4 such as 0x01, 0x02, 0x03, and 0x04. Thus, after receiving this command sequence, the flash memory device 110 can be arranged to enable the simultaneous execution operation of the set-feature operation (i.e. instantly executing the set-feature operation after this set-feature is received) and to store the index value position (i.e. 3), the feature address 0x20, and corresponding parameter data into the table LUT1 of the memory cell array 1107.

A fifth command sequence in FIG. 24 sequentially comprises the prefix command such as EEh, the index value position address/information such as 0x04, the set-feature command D5h, a logical unit number address LUN_n, the feature address such as 0x10, and feature information data or parameters P1-P4 such as 0x10, 0x20, 0x30, and 0x40. Thus, after receiving this command sequence, the flash memory device 110 can be arranged to enable the simultaneous execution operation of the set-feature operation (i.e. instantly executing the set-feature operation after this set-feature is received) and to store the index value position (i.e. 4), the feature address 0x10, and corresponding parameter data into the table LUT1 of the memory cell array 1107.

Then, after receiving the command sequences in FIG. 24, the flash memory device 110 can use only one table to respectively store the index value positions, feature addresses, and parameter data of all set-feature signals as follows:

Example of Table LUT1:

| Index value | Feature address | P1 | P2 | P3 | P4 |
|---|---|---|---|---|---|
| 0 | 0x01 | 0x00 | 0x00 | 0x00 | 0x00 |
| 1 | 0x02 | 0x10 | 0x20 | 0x30 | 0x40 |
| 2 | 0x03 | 0x01 | 0x02 | 0x03 | 0x04 |

| Index value | Feature address | P1 | P2 | P3 | P4 |
| --- | --- | --- | --- | --- | --- |
| 3 | 0x20 | 0x01 | 0x02 | 0x03 | 0x04 |
| 4 | 0x10 | 0x10 | 0x20 | 0x30 | 0x40 |

Figure 25:
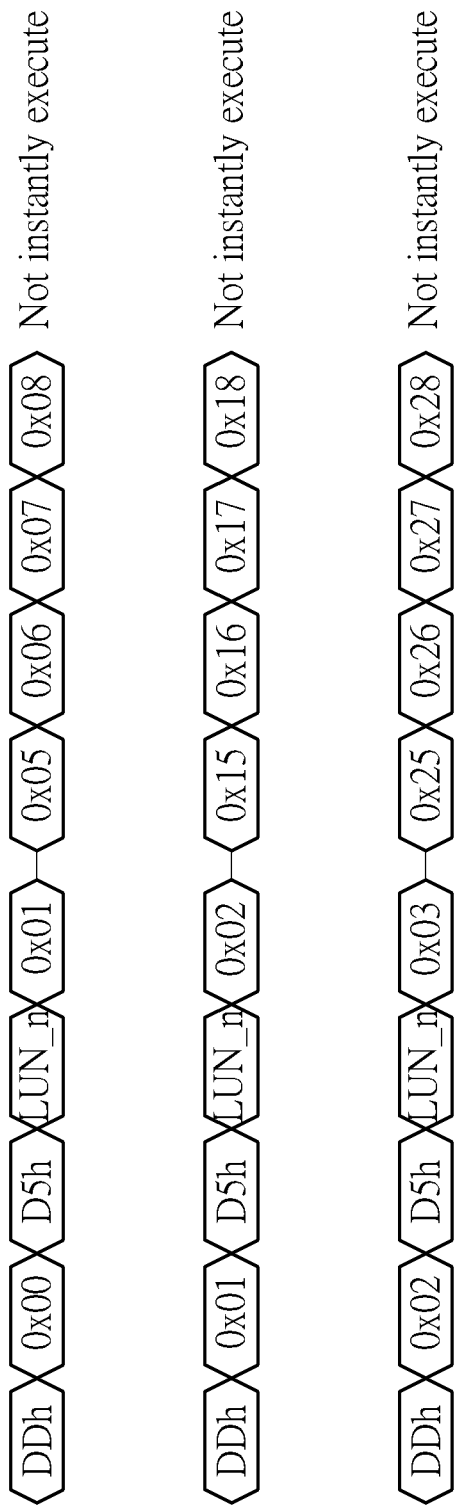
FIG. 25 is a diagram of an example of the flash memory controller sequentially transmitting a sequence of command sequences to modify parameter data of the set-feature operations based on the signal format of FIG. 23 according to another embodiment of the invention.

Also, the flash memory controller 105 can send a group of set-feature signals by using the macro start signal and macro end signal to appropriate modify the information data stored in the table. FIG. 25 is a diagram of an example of the flash memory controller 105 sequentially transmitting a sequence of command sequences to modify parameter data of the set-feature operations based on the signal format of FIG. 23 according to another embodiment of the invention. In FIG. 25, for example (but not limited), a first command sequence, sent by the flash memory controller 105, sequentially comprises the prefix command such as DDh, the index value position address/information such as 0x00, the set-feature command D5h, a logical unit number address LUN_n, the feature address such as 0x01, and feature information data or parameters P1-P4 wherein the feature data P1-P4 respectively carry information of 0x05, 0x06, 0x07, and 0x08. A second command sequence, sent by the flash memory controller 105, sequentially comprises the prefix command such as DDh, the index value position address/information such as 0x01, the set-feature command D5h, a logical unit number address LUN_n, the feature address such as 0x02, and feature information data or parameters P1-P4 wherein the feature data P1-P4 respectively carry information of 0x15, 0x16, 0x17, and 0x18. A third command sequence, sent by the flash memory controller 105, sequentially comprises the prefix command such as DDh, the index value position address/information such as 0x02, the set-feature command D5h, a logical unit number address LUN_n, the feature address such as 0x03, and feature information data or parameters P1-P4 wherein the feature data P1-P4 respectively carry information of 0x25, 0x26, 0x27, and 0x28. Thus, when receiving the above-mentioned command sequences in FIG. 25, the flash memory device 110 can update the corresponding parameter data fields of the feature addresses 0x01, 0x02, and 0x03 previously stored in the third table as follows:

The updated first table LUT1:

| Index value | Feature address | P1 | P2 | P3 | P4 |
| --- | --- | --- | --- | --- | --- |
| 0 | 0x01 | 0x05 | 0x06 | 0x07 | 0x08 |
| 1 | 0x02 | 0x15 | 0x16 | 0x17 | 0x18 |
| 2 | 0x03 | 0x25 | 0x26 | 0x27 | 0x28 |
| 3 | 0x20 | 0x01 | 0x02 | 0x03 | 0x04 |
| 4 | 0x10 | 0x10 | 0x20 | 0x30 | 0x40 |

For controlling the flash memory device 110 executing one or more set-feature operations recorded in the first table LUT1, the flash memory controller 105 can send a macro execution signal based on the format defined in FIG. 19. The examples are identical to those shown in FIG. 22 and are not detailed for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller to be used in a storage device and coupled to a flash memory device of the storage device through a specific communication interface, comprising:
   an input/output (I/O) circuit, coupled to the flash memory device through the specific communication interface, for sending commands and data between the flash memory device and a processor; and
   the processor, coupled to the I/O circuit, for controlling the I/O circuit using a set-feature signal, which carries a set-feature command, a macro execution feature address, and corresponding macro execution parameter information, as a macro execution signal and transmitting the macro execution signal to the flash memory device to make the flash memory device execute multiple set-feature operations of multiple set-feature signals respectively having unique information defined by the corresponding macro execution parameter information carried in the macro execution signal, wherein the corresponding macro execution parameter information is used to indicate the multiple set-feature operations of the multiple set-feature signals to be triggered and executed by the set-feature signal;
   wherein the processor controls the I/O circuit sequentially transmitting a prefix signal and a first set-feature signal, which follows the prefix signal, to generate and transmit a command sequence to the flash memory device; the prefix signal sequentially comprises a first macro command and an index value of the first set-feature signal which is followed by the set-feature command in the first set-feature signal; the first macro command is used to indicate instantly executing or not instantly executing a set-feature operation of the first set-feature signal when the first set-feature signal is received by the flash memory device.

2. The flash memory controller of claim 1, wherein the corresponding macro execution parameter information comprises a parameter data which is used to indicate a starting position of index values of the multiple set-feature operations or a macro number corresponding to the multiple set-feature operations.

3. The flash memory controller of claim 1, wherein the corresponding macro execution parameter information comprises a first parameter data and a second parameter data; the first parameter data is used to indicate a starting position of index values of the multiple set-feature operations, and the second parameter data is used to indicate an amount of index values of the multiple set-feature operations.

4. The flash memory controller of claim 1, wherein the processor controls the I/O circuit sequentially transmitting a macro start signal, multiple set-feature signals corresponding to the multiple set-feature operations, and a macro end signal to the flash memory device; and, the macro start signal and the macro end signal comply with a signal format of a set-feature signal and are respectively used to indicate a start of the multiple set-feature signals and an end of the multiple set-feature signals.

5. The flash memory controller of claim 4, wherein the macro start signal sequentially comprises a set-feature command, a macro start feature address, and corresponding macro start parameter information which indicates a macro setting of the multiple set-feature operations; the corresponding macro start parameter information comprises a first parameter data, a second parameter data, and a third parameter data including a first parameter bit and a second parameter bit; the first parameter data is used to indicate a macro number of the multiple set-feature operations; the second parameter data is used to indicate a starting position of index values of the multiple set-feature operations; when the first parameter bit of the third parameter data is set as a first logic bit, a function of simultaneously executing the multiple set-feature operations when the multiple set-feature signals being received is disabled; when the first parameter bit is set as a second logic bit, the function of simultaneously executing the multiple set-feature operations when the multiple set-feature signals being received is enabled; when the second parameter bit is set as the first logic bit, a macro record stored in the flash memory device is kept; and, when the second parameter bit is set as the second logic bit, the macro record is cleared by the flash memory device.

6. The flash memory controller of claim 4, wherein the macro end signal sequentially comprises a set-feature command, a macro end feature address, and corresponding macro end parameter information; the corresponding macro end parameter information comprises a first parameter data and a second parameter data; the first parameter data is used to indicate a macro number of the multiple set-feature operations; and, the second parameter data is used to indicate an ending position of index values of the multiple set-feature operations.

7. The flash memory controller of claim 1, wherein the processor controls the I/O circuit sequentially transmitting a macro start signal and a macro end signal, which follows the macro start signal, to the flash memory device, to perform a set-feature function for a subset of the multiple set-feature operations; and, the macro start signal and the macro end signal comply with a signal format of a set-feature signal and are respectively used to indicate a start of the multiple set-feature signals and an end of the multiple set-feature signals.

8. The flash memory controller of claim 4, wherein the macro start signal sequentially comprises a set-feature command, a macro start feature address, and corresponding macro start parameter information which indicates a macro setting of the multiple set-feature operations; the corresponding macro start parameter information comprises a first parameter data, a second parameter data, and a third parameter data; the first parameter data is used to indicate a starting position of index values of the multiple set-feature operations; when the second parameter data is set as a first logic bit, a function of simultaneously executing the multiple set-feature operations when the multiple set-feature signals being received is disabled; when the second parameter data is set as a second logic bit, the function of simultaneously executing the multiple set-feature operations when the multiple set-feature signals being received is enabled; when the third parameter data is set as the first logic bit, a macro record stored in the flash memory device is kept; and, when the third parameter data is set as the second logic bit, the macro record is cleared by the flash memory device.

9. The flash memory controller of claim 4, wherein the macro end signal sequentially comprises a set-feature command, a macro end feature address, and corresponding macro end parameter information; the corresponding macro end parameter information comprises a first parameter data which is used to indicate an ending position of index values of the multiple set-feature operations.

10. The flash memory controller of claim 4, wherein the macro start signal sequentially comprises a set-feature command, a specific macro feature address, and corresponding macro parameter information which indicates a macro setting of the multiple set-feature operations; the corresponding macro parameter information comprises a first parameter data, a second parameter data, a third parameter data, and a four parameter data; the first parameter data is used to indicate a starting position of index values of the multiple set-feature operations; when the second parameter data is set as a first logic bit, a function of simultaneously executing the multiple set-feature operations when the multiple set-feature signals being received is disabled; when the second parameter data is set as a second logic bit, the function of simultaneously executing the multiple set-feature operations when the multiple set-feature signals being received is enabled; when the third parameter data is set as the first logic bit, a macro record stored in the flash memory device is kept; and, when the third parameter data is set as the second logic bit, the macro record is cleared by the flash memory device; when the fourth parameter data is set as the first logic bit to indicate the macro start signal.

11. The flash memory controller of claim 4, wherein the macro end signal sequentially comprises a set-feature command, a specific macro feature address, and corresponding macro parameter information which indicates a macro setting of the multiple set-feature operations; the corresponding macro parameter information comprises a first parameter data, a second parameter data, a third parameter data, and a four parameter data; the first parameter data is used to indicate a starting position of index values of the multiple set-feature operations; when the second parameter data is set as a first logic bit, a function of simultaneously executing the multiple set-feature operations when the multiple set-feature signals being received is disabled; when the second parameter data is set as a second logic bit, the function of simultaneously executing the multiple set-feature operations when the multiple set-feature signals being received is enabled; when the third parameter data is set as the first logic bit, a macro record stored in the flash memory device is kept; and, when the third parameter data is set as the second logic bit, the macro record is cleared by the flash memory device; when the fourth parameter data is set as the second logic bit to indicate the macro end signal.

12. The flash memory controller of claim 1, wherein a logical unit number address is positioned between the set-feature command and the macro execution feature address in the macro execution signal.

13. The flash memory controller of claim 1, wherein the processor controls the I/O circuit sending a get-feature signal, which sequentially comprises a get-feature command and a logical unit number address, to the flash memory device to make the flash memory device send macro numbers, index values, or feature addresses of the multiple set-feature operations back to the flash memory controller.

14. A method of a flash memory controller to be used in a storage device and coupled to a flash memory device of the storage device through a specific communication interface, comprising:
providing an input/output (I/O) circuit to send commands and data between the flash memory device and a processor; and
providing the processor, and using the processor for controlling the I/O circuit using a set-feature signal, which carries a set-feature command, a macro execution feature address, and corresponding macro execution parameter information, as a macro execution signal and transmitting the macro execution signal to the flash memory device to make the flash memory device execute multiple set-feature operations of multiple set-feature signals respectively having unique information defined by the corresponding macro execution parameter information carried in the macro execution signal;

sequentially transmitting a prefix signal and a first set-feature signal, which follows the prefix signal, to generate and transmit a command sequence to the flash memory device; the prefix signal sequentially comprises a first macro command and an index value of the first set-feature signal which is followed by the set-feature command in the first set-feature signal; the first macro command is used to indicate instantly executing or not instantly executing a set-feature operation of the first set-feature signal when the first set-feature signal is received by the flash memory device;

wherein the corresponding macro execution parameter information is used to indicate the multiple set-feature operations of the multiple set-feature signals to be triggered and executed by the set-feature signal.

15. The method of claim 14, wherein the corresponding macro execution parameter information comprises a parameter data which is used to indicate a starting position of index values of the multiple set-feature operations or a macro number corresponding to the multiple set-feature operations.

16. The method of claim 14, wherein the corresponding macro execution parameter information comprises a first parameter data and a second parameter data; the first parameter data is used to indicate a starting position of index values of the multiple set-feature operations, and the second parameter data is used to indicate an amount of index values of the multiple set-feature operations.

17. The method of claim 14, further comprising:
sequentially transmitting a macro start signal, multiple set-feature signals corresponding to the multiple set-feature operations, and a macro end signal to the flash memory device; and, the macro start signal and the macro end signal comply with a signal format of a set-feature signal and are respectively used to indicate a start of the multiple set-feature signals and an end of the multiple set-feature signals.

18. The method of claim 17, wherein the macro start signal sequentially comprises a set-feature command, a macro start feature address, and corresponding macro start parameter information which indicates a macro setting of the multiple set-feature operations; the corresponding macro start parameter information comprises a first parameter data, a second parameter data, and a third parameter data including a first parameter bit and a second parameter bit; the first parameter data is used to indicate a macro number of the multiple set-feature operations; the second parameter data is used to indicate a starting position of index values of the multiple set-feature operations; when the first parameter bit of the third parameter data is set as a first logic bit, a function of simultaneously executing the multiple set-feature operations when the multiple set-feature signals being received is disabled; when the first parameter bit is set as a second logic bit, the function of simultaneously executing the multiple set-feature operations when the multiple set-feature signals being received is enabled; when the second parameter bit is set as the first logic bit, a macro record stored in the flash memory device is kept; and, when the second parameter bit is set as the second logic bit, the macro record is cleared by the flash memory device.

19. The method of claim 17, wherein the macro end signal sequentially comprises a set-feature command, a macro end feature address, and corresponding macro end parameter information; the corresponding macro end parameter information comprises a first parameter data and a second parameter data; the first parameter data is used to indicate a macro number of the multiple set-feature operations; and, the second parameter data is used to indicate an ending position of index values of the multiple set-feature operations.

20. The method of claim 14, further comprising:
sequentially transmitting a macro start signal and a macro end signal, which follows the macro start signal, to the flash memory device, to perform a set-feature function for a subset of the multiple set-feature operations; and, the macro start signal and the macro end signal comply with a signal format of a set-feature signal and are respectively used to indicate a start of the multiple set-feature signals and an end of the multiple set-feature signals.

21. The method of claim 17, wherein the macro start signal sequentially comprises a set-feature command, a macro start feature address, and corresponding macro start parameter information which indicates a macro setting of the multiple set-feature operations; the corresponding macro start parameter information comprises a first parameter data, a second parameter data, and a third parameter data; the first parameter data is used to indicate a starting position of index values of the multiple set-feature operations; when the second parameter data is set as a first logic bit, a function of simultaneously executing the multiple set-feature operations when the multiple set-feature signals being received is disabled; when the second parameter data is set as a second logic bit, the function of simultaneously executing the multiple set-feature operations when the multiple set-feature signals being received is enabled; when the third parameter data is set as the first logic bit, a macro record stored in the flash memory device is kept; and, when the third parameter data is set as the second logic bit, the macro record is cleared by the flash memory device.

22. The method of claim 17, wherein the macro end signal sequentially comprises a set-feature command, a macro end feature address, and corresponding macro end parameter information; the corresponding macro end parameter information comprises a first parameter data which is used to indicate an ending position of index values of the multiple set-feature operations.

23. The method of claim 17, wherein the macro start signal sequentially comprises a set-feature command, a specific macro feature address, and corresponding macro parameter information which indicates a macro setting of the multiple set-feature operations; the corresponding macro parameter information comprises a first parameter data, a second parameter data, a third parameter data, and a four parameter data; the first parameter data is used to indicate a starting position of index values of the multiple set-feature operations; when the second parameter data is set as a first logic bit, a function of simultaneously executing the multiple set-feature operations when the multiple set-feature signals being received is disabled; when the second parameter data is set as a second logic bit, the function of simultaneously executing the multiple set-feature operations when the multiple set-feature signals being received is enabled; when the third parameter data is set as the first logic bit, a macro record stored in the flash memory device is kept; and, when the third parameter data is set as the second logic bit, the macro record is cleared by the flash memory device; when the fourth parameter data is set as the first logic bit to indicate the macro start signal.

24. The method of claim 17, wherein the macro end signal sequentially comprises a set-feature command, a specific macro feature address, and corresponding macro parameter information which indicates a macro setting of the multiple set-feature operations; the corresponding macro parameter information comprises a first parameter data, a second parameter data, a third parameter data, and a four parameter data; the first parameter data is used to indicate a starting position of index values of the multiple set-feature operations; when the second parameter data is set as a first logic bit, a function of simultaneously executing the multiple set-feature operations when the multiple set-feature signals being received is disabled; when the second parameter data is set as a second logic bit, the function of simultaneously executing the multiple set-feature operations when the multiple set-feature signals being received is enabled; when the third parameter data is set as the first logic bit, a macro record stored in the flash memory device is kept; and, when the third parameter data is set as the second logic bit, the macro record is cleared by the flash memory device; when the fourth parameter data is set as the second logic bit to indicate the macro end signal.

25. The method of claim 14, wherein a logical unit number address is positioned between the set-feature command and the macro execution feature address in the macro execution signal.

26. The method of claim 14, further comprising:
sending a get-feature signal, which sequentially comprises a get-feature command and a logical unit number address, to the flash memory device to make the flash memory device send macro numbers, index values, or feature addresses of the multiple set-feature operations back to the flash memory controller.

* * * * *